United States Patent [19]
Kise

[11] Patent Number: 5,650,944
[45] Date of Patent: *Jul. 22, 1997

[54] SHUTTER SPEED CONTROL METHOD AND SYSTEM

[75] Inventor: Katsuyuki Kise, Tokyo, Japan

[73] Assignee: Fuji Jukogyo Kabushiki Kaisha, Japan

[ * ] Notice: The term of this patent shall not extend beyond the expiration date of Pat. No. 5,535,144.

[21] Appl. No.: 598,637

[22] Filed: Feb. 13, 1996

Related U.S. Application Data

[63] Continuation of Ser. No. 198,570, Feb. 18, 1994, Pat. No. 5,535,144.

[30] Foreign Application Priority Data

Mar. 24, 1993 [JP] Japan .................................. 5-65498
Dec. 24, 1993 [JP] Japan .................................. 5-328802

[51] Int. Cl.⁶ .................................................. G01B 9/00
[52] U.S. Cl. .............................. 364/561; 348/116; 348/47
[58] Field of Search ............................ 364/561, 424.01, 364/424.02; 348/113, 116, 118, 143, 148, 42–50; 382/106, 280, 168; 396/169, 246, 324; 33/20.4

[56] References Cited

U.S. PATENT DOCUMENTS

| 4,926,346 | 5/1990 | Yokoyama | 364/424.02 |
| 4,985,847 | 1/1991 | Shioya et al. | 364/424.05 |
| 5,161,632 | 11/1992 | Asayama | 364/424.01 |
| 5,253,050 | 10/1993 | Karasudani | 358/103 |
| 5,410,346 | 4/1995 | Saneyoshi et al. | 348/116 |
| 5,535,144 | 7/1996 | Kise | 364/561 |

Primary Examiner—James P. Trammell
Attorney, Agent, or Firm—Beveridge, DeGrandi, Weilacher & Young, LLP

[57] ABSTRACT

A distance detecting system for detecting a distance to an object from a moving body such an automobile by means of imaging pictures by an imaging apparatus and processing pictures into distance distribution information, the imaging apparatus having a capability of always providing proper image pictures under rapidly changing illuminance conditions, whereby securing an accuracy in the distance detecting system.

18 Claims, 17 Drawing Sheets

FIG.5
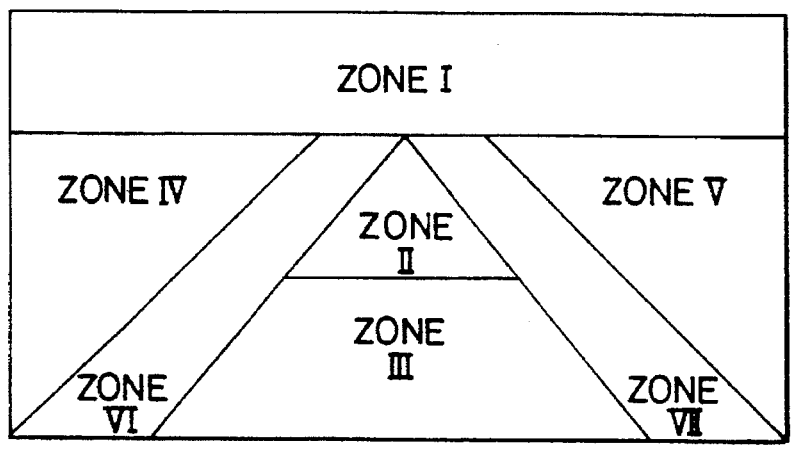
FIG.6
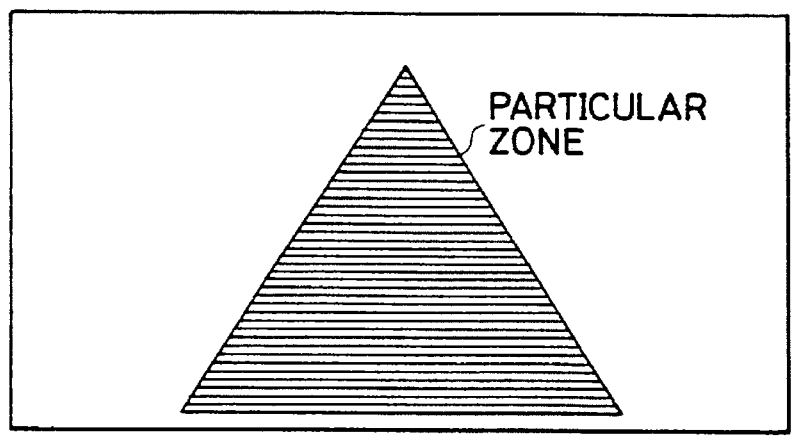
FIG.7
| ZONE | ZONE I | ZONE II | ZONE III | ZONE IV | ZONE V | ZONE VI | ZONE VII |
|---|---|---|---|---|---|---|---|
| AVERAGED BRIGHTNESS | F0H | 40H | 60H | 20H | 20H | 80H | 80H |

FIG. 8

ZONE I

| SHUTTER SPEED | 00H | 20H | 40H | 60H | 80H | A0H | C0H | E0H | FFH |
|---|---|---|---|---|---|---|---|---|---|
| 1/10000 | −1 | −1 | −1 | 0 | 0 | 0 | 0 | 0 | |
| 1/4000  | −1 | −1 | −1 | 0 | 0 | +1 | +1 | +1 | |
| 1/2000  | −1 | −1 | −1 | 0 | 0 | +1 | +1 | +1 | |
| 1/1000  | −1 | −1 | −1 | 0 | 0 | +1 | +1 | +1 | |
| 1/500   | −1 | −1 | −1 | 0 | 0 | +1 | +1 | +1 | |
| 1/250   | −1 | −1 | −1 | 0 | 0 | +1 | +1 | +1 | |
| 1/125   | −1 | −1 | −1 | 0 | 0 | +1 | +1 | +1 | |
| 1/50    | 0  | 0  | 0  | 0 | 0 | +1 | +1 | +1 | |

AVERAGED BRIGHTNESS

FIG. 9

ZONE II

| SHUTTER SPEED | 00H | 20H | 40H | 60H | 80H | A0H | C0H | E0H | FFH |
|---|---|---|---|---|---|---|---|---|---|
| 1/10000 | −2 | −2 | −1 | 0 | 0 | 0  | 0  | 0  | |
| 1/4000  | −2 | −2 | −1 | 0 | 0 | +1 | +1 | +1 | |
| 1/2000  | −2 | −2 | −1 | 0 | 0 | +1 | +2 | +2 | |
| 1/1000  | −2 | −2 | −1 | 0 | 0 | +1 | +2 | +2 | |
| 1/500   | −2 | −2 | −1 | 0 | 0 | +1 | +2 | +2 | |
| 1/250   | −2 | −2 | −1 | 0 | 0 | +1 | +2 | +2 | |
| 1/125   | −1 | −1 | −1 | 0 | 0 | +1 | +2 | +2 | |
| 1/50    | 0  | 0  | 0  | 0 | 0 | +1 | +2 | +2 | |

AVERAGED BRIGHTNESS

FIG. 10

ZONE III

| SHUTTER SPEED | 00H | 20H | 40H | 60H | 80H | A0H | C0H | E0H | FFH |
|---|---|---|---|---|---|---|---|---|---|
| 1/10000 | -3 | -2 | -1 | 0 | 0 | 0 | 0 | 0 | |
| 1/4000 | -3 | -2 | -1 | 0 | 0 | +1 | +1 | +1 | |
| 1/2000 | -3 | -2 | -1 | 0 | 0 | +1 | +2 | +2 | |
| 1/1000 | -3 | -2 | -1 | 0 | 0 | +1 | +2 | +3 | |
| 1/500 | -3 | -2 | -1 | 0 | 0 | +1 | +2 | +3 | |
| 1/250 | -2 | -2 | -1 | 0 | 0 | +1 | +2 | +3 | |
| 1/125 | -1 | -1 | -1 | 0 | 0 | +1 | +2 | +3 | |
| 1/50 | 0 | 0 | 0 | 0 | 0 | +1 | +2 | +3 | |

AVERAGED BRIGHTNESS

FIG. 11

ZONE IV·V

| SHUTTER SPEED | 00H | 20H | 40H | 60H | 80H | A0H | C0H | E0H | FFH |
|---|---|---|---|---|---|---|---|---|---|
| 1/10000 | -2 | -1 | 0 | 0 | 0 | 0 | 0 | 0 | |
| 1/4000 | -2 | -1 | 0 | 0 | 0 | +1 | +1 | +1 | |
| 1/2000 | -2 | -1 | 0 | 0 | 0 | +1 | +2 | +2 | |
| 1/1000 | -2 | -1 | 0 | 0 | 0 | +1 | +2 | +2 | |
| 1/500 | -2 | -1 | 0 | 0 | 0 | +1 | +2 | +2 | |
| 1/250 | -2 | -1 | 0 | 0 | 0 | +1 | +2 | +2 | |
| 1/125 | -1 | -1 | 0 | 0 | 0 | +1 | +2 | +2 | |
| 1/50 | 0 | 0 | 0 | 0 | 0 | +1 | +2 | +2 | |

AVERAGED BRIGHTNESS

FIG.12

ZONE VI·VII

| SHUTTER SPEED | 00H | 20H | 40H | 60H | 80H | A0H | C0H | E0H | FFH |
|---|---|---|---|---|---|---|---|---|---|
| 1/10000 | -3 | -2 | -1 | 0 | 0 | 0 | 0 | 0 | |
| 1/4000 | -3 | -2 | -1 | 0 | 0 | +1 | +1 | +1 | |
| 1/2000 | -3 | -2 | -1 | 0 | 0 | +1 | +2 | +2 | |
| 1/1000 | -3 | -2 | -1 | 0 | 0 | +1 | +2 | +3 | |
| 1/500 | -3 | -2 | -1 | 0 | 0 | +1 | +2 | +3 | |
| 1/250 | -2 | -2 | -1 | 0 | 0 | +1 | +2 | +3 | |
| 1/125 | -1 | -1 | -1 | 0 | 0 | +1 | +2 | +3 | |
| 1/50 | 0 | 0 | 0 | 0 | 0 | +1 | +2 | +3 | |

AVERAGED BRIGHTNESS

PRIOR ART

SHUTTER SPEED CONTROL METHOD AND SYSTEM

This application is a continuation of U.S. patent application Ser. No. 08/198,570 filed on Feb. 18, 1994, U.S. Pat. No. 5,535,144, which application is entirely incorporated herein by reference.

BACKGROUND OF THE INVENTION

1. Field of the Invention

The present invention relates to a distance detecting system for a moving body like an automobile. More specially, the present invention is directed to an automobile distance detecting system capable of detecting a distance to an obstacle more precisely by controlling a sensitivity of the image system and processing a picture image into an appropriate image signal.

2. Description of the Prior Art

Automobiles have been an indispensable existence to the modern society because of their expediency and comfortableness. On the other hand, the number of accidents caused by automobiles are increasing year by year and a great concern is paid for decreasing those accidents. One aspect of means for decreasing them is asked in automobiles themselves, that is to say, developing vehicles which are able to avoid accidents autonomously by judgments of the automobiles themselves. To avoid collisions autonomously, first of all, it is most important to detect an object to hamper a running of a vehicle and on the other hand it is necessary to recognize the position where the detected obstacle is placed on the road. As promising means for attaining these purposes, recently such a technique as imaging a scenery outside of a vehicle by a video camera using a solid-sate component like a CCD (Charge Coupled Device) mounted on the vehicle, and measuring a distance from the vehicle to the object by making an image process on the imaged picture, has been introduced. For example, Japanese patent application laid-open No. 197816 (1984) discloses a technology in which a three-dimensional position of an obstacle is calculated based on images taken by two video cameras mounted on a front part of the vehicle. This technique employs a so-called stereoscopical method based on a principle of triangulation and more specially the method includes a technique for measuring a distance to an obstacle by extracting the obstacle from a two-dimensional brightness distribution pattern and then obtaining a positional difference of the obstacle images on the two image pictures. However, in this method an accuracy for measuring distance is deteriorated due to the difference of brightness between the right image and the left one when there is a discrepancy of sensitivity between two cameras. To overcome the above shortcoming, as illustrated in FIG. 26, there is a prior art system using a CCD camera 101 equipped with an auto-iris lens 100 which automatically adjusts a diaphragm thereof according to an amplitude of an iris signal from the CCD camera 101 (for example, a larger amplitude when it is bright and a smaller amplitude when it is dark). From hence, it is easily considered that this auto-iris lens is applied to the abovementioned stereoscopical method. However, even with this improved apparatus there is still a problem in a distance detecting accuracy because each of the right and left auto-iris lens has an inherent characteristic which causes differences in the diaphragm setting or the diaphragm operational time between the two lenses, thereby a small discrepancy of brightness is caused between the right and left images. Also a still further problem is that the apparatus is unable to follow such a condition as illuminance changes rapidly, for instance, a case where a vehicle goes into or comes out of tunnels, because of a time lag of the auto-iris mechanism.

Further, Japanese patent application laid-open No. 188178 (1989) proposes an image display apparatus for vehicle which can catch a following vehicle securely. More specially the apparatus has ensures that a vehicle driver to recognizes the following vehicle (a vehicle running behind) even during a night running without being blinded by the headlights of following vehicles by means of correcting a brightness in a high brightness zone when comparing means detect a larger image signal than a predetermined standard value during the image processing of roads and surrounding vehicles.

SUMMARY OF THE INVENTION

The present invention has been made in view of the foregoing situations and an object of the invention is to provide a distance detecting system for a vehicle capable of obtaining a right image picture and improving a distance detecting accuracy under a condition of rapidly changing illuminance.

A distance detecting system for a vehicle according to a first aspect of the present invention, having a device for imaging an object outside of a vehicle by an image sensing apparatus (referred to as imaging apparatus, hereinafter), a picture memory (referred to as image memory, hereinafter) for memorizing the image taken by the imaging apparatus, a device for processing the image and a device for calculating a distance distribution to the object on an entire picture based on the processed image, comprises a buffer memory connected in parallel with the above image memory for storing the image and sensitivity adjusting means for adjusting a sensitivity of the imaging apparatus so as to obtain a proper image picture corresponding to an illuminance outside of a vehicle by controlling a shutter speed of the imaging apparatus based on the image data stored in the buffer memory.

Further, a distance detecting system for a vehicle according to a second aspect of the present invention, comprises the sensitivity adjusting means according to the first aspect of the present invention in which the image picture memorized in the buffer memory is divided into a plurality of zones and an average brightness of the zone is calculated for every zone and a proper shutter speed level (described hereinafter) is determined for each zone from a map parameterizing a brightness and a shutter speed based on this average brightness and the present shutter speed and a shutter speed for the next image is determined by summing the shutter speed levels as determined above.

Further, a distance detecting system for a vehicle according to a third aspect of the present invention, comprises the sensitivity adjusting means according to the first aspect of the present invention in which a particular zone is selected from the above zones and a shutter speed for the next image is determined by calculating a correcting amount of shutter speed level to the present shutter speed level from a histogram of brightness for this particular zone.

BRIEF DESCRIPTION OF THE DRAWINGS

The present invention will be described hereinafter in connection with the accompanying drawings, in which:

FIG. 1 to FIG. 23 indicate a preferred embodiment according to the present invention, wherein FIG. 1 shows a diagrammic view of the distance detecting system according to the present invention;

FIG. 2 is a schematic side view of a vehicle incorporating the distance detecting system according to the present invention;

FIG. 3 is a schematic front view of a vehicle incorporating the distance detecting system according to the present invention;

FIG. 4 is an explanatory drawing showing a relationship between a camera and an object;

FIG. 5 is a schematic drawing for indicating divided zones;

FIG. 6 is a schematic drawing for indicating a particular zone;

FIG. 7 is an example of a table showing an average brightness of a zone;

FIG. 8 is an example of a shutter speed level map for Zone I;

FIG. 9 is an example of a shutter speed level map for Zone II;

FIG. 10 is an example of a shutter speed level map for Zone III;

FIG. 11 is an example of a shutter speed level map for Zone IV and V;

FIG. 12 is an example of a shutter speed level map for Zone VI and VII;

FIG. 13 is an explanatory view showing a city-block distance calculation circuit;

FIG. 14 is a block diagram showing a minimum value detecting circuit;

FIG. 15 is a flowchart showing a shutter speed control process;

FIG. 16 is a flowchart showing an averaging process;

FIG. 17 is a flowchart showing a distance detecting process;

FIG. 18 is an explanatory view showing a storing order in a shift register;

FIG. 19 is a timing chart showing an operation of a city-block distance calculation circuit;

FIG. 20 is a timing chart showing an operation of a deviation amount determining section;

FIG. 21 is a timing chart showing an overall operation of the system;

FIG. 22 is an explanatory view showing an example of an image taken by a CCD camera mounted on the vehicle; and FIG. 23 is a drawing showing an object space on an image plane.

DESCRIPTION OF THE PREFERRED EMBODIMENT

Figure 2:
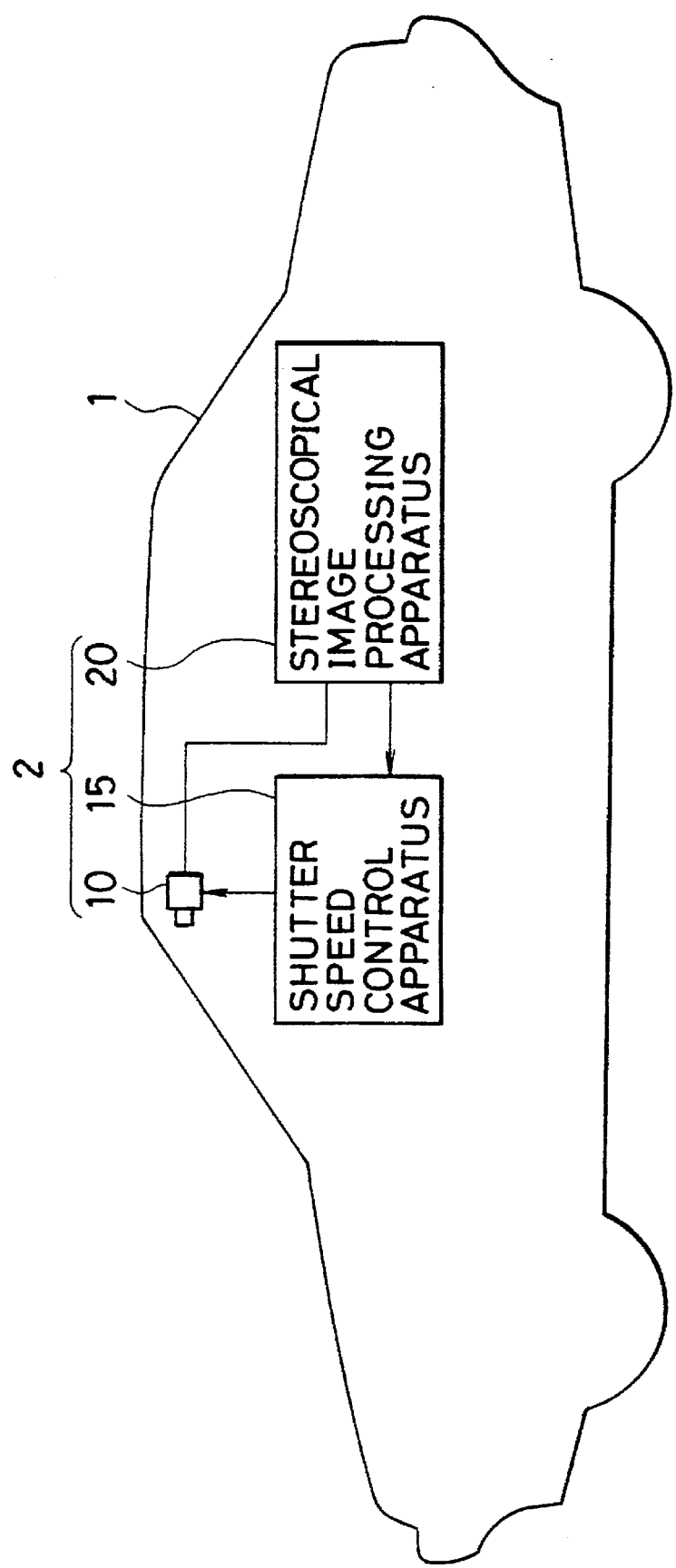

In FIG. 2, numeral 1 denotes a vehicle such as an automobile on which a distance detecting system 2 for detecting a distance by imaging an object is mounted. The distance detecting system is connected to an apparatus for recognizing an obstacle on a road (not shown) to form an obstacle monitoring system for warning a vehicle driver or autonomously avoiding a collision with the obstacle.

The distance detecting system 2 comprises a stereoscopical optic system 10 as an imaging apparatus for taking the optic image within a predetermined area outside the vehicle, a shutter speed control apparatus 15 for controlling a shutter speed so as to take a proper image picture by adjusting a sensitivity (shutter speed) of the stereoscopical optic system 10 and a stereoscopical image processing apparatus 20 for processing a picture imaged by the stereoscopical optic system 10 and for calculating a distance distribution on an entire image picture. The three-dimensional distance data processed by the stereoscopical image processing apparatus 20 are inputted into the obstacle recognizing apparatus in which a road shape and an obstacle are recognized.

Figure 3:
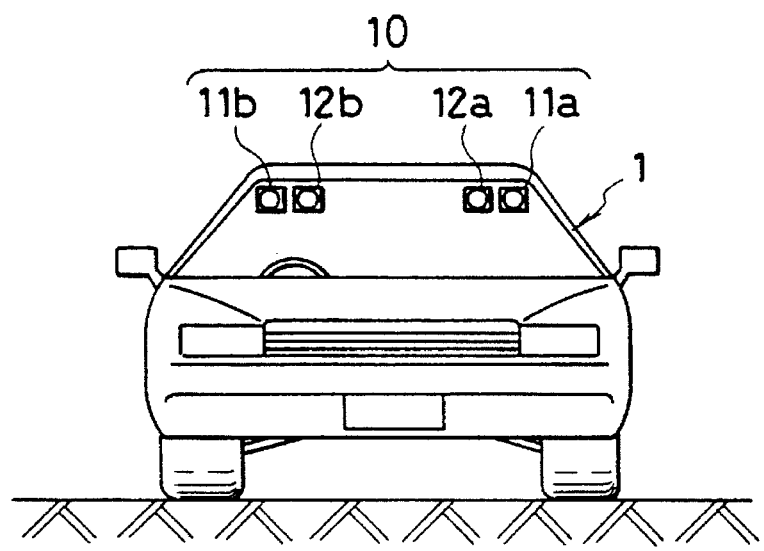

The stereoscopical optic system 10 is composed of a camera using a solid-state imaging element such as a charge coupled device (CCD). As shown in FIG. 3, the system 10 has two CCD cameras 11a and 11b (represented by 11 if necessary) for left and right angles of a long distance, and two CCD cameras 12a and 12b (represented by 12 if necessary) for left and right angles of a short distance. These cameras 11 and 12 are mounted at the front ceiling in the passenger compartment of the vehicle 1. More particularly, the camera 12a and 12b for a short distance are disposed with a given space inside the cameras 11a and 11b for a long distance.

It is sufficient for the stereoscopical optic system 10 to be able to measure the position of objects from 2 to 100 meters ahead of the vehicle 1 provided that the position where the CCD cameras 11 and 12 are installed in the passenger compartment is two meters away from the front edge of the bonnet of the vehicle 1.

Figure 4:
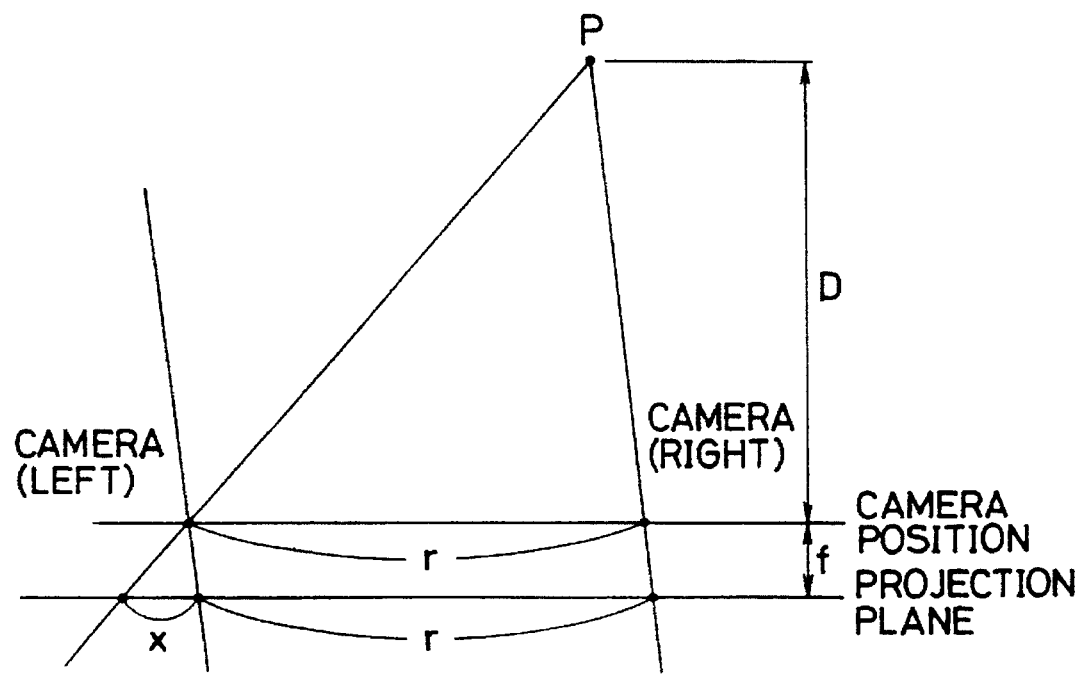

That is to say, as shown in FIG. 4, an image of a point P is imaged on a projection plane distant from the cameras 11a and 11b (correctly speaking, an optical center of the lens for each camera) by f and a distance D is given by:

$$D = r \cdot f / x \quad (1)$$

where r is a space between two CCD cameras 11a and 11b for a long distance (correctly a space between optical axes for cameras 11a and 11b), D is a distance of the point P from the position of cameras 11a and 11b (correctly a distance from an optical center of the lens of each camera), f is a focal length of lenses for cameras 11a and 11b and x is an amount of deviation of the image object formed by the camera for left angle from the one formed by the camera for right angle.

In order to detect the amount of deviation x, it is necessary to find out images of the same object in the left and right pictures. According to the present invention, in the stereoscopical image processing apparatus 10 an image picture is divided into a small region, then a pattern of brightness (or colors if necessary) are compared between the left and right image pictures for every small region to find coincident regions in the pattern of brightness or colors therein and a distance distribution is obtained on the entire picture.

This way of using brightness of the image picture is superior, because of affluence of the information amount, to the prior art in which some features are extracted from edges, lines, particular configurations or the like for each region and coincident portions between the right and left pictures are found.

Where "i" th picture elements of the left and right pictures are designated as $A_i$ and $B_i$ respectively, the coincidence between the left and right pictures can be expressed by a city-block distance H as shown in the following formula (2) for example.

$$H = \Sigma |A_i - B_i|$$

With respect to the size of the aforementioned region, a too large region bears a high possibility that there coexist a long distance object and a short distance one in the region, resulting in an ambiguous distance detection. On the other hand, a too small region produces a lack of information for investigating coincidences. Thus, there is an optimum size region in order to obtain a best match.

As a result of experiments to obtain an optimum number of picture elements by dividing a picture up to such a size as a vehicle with 1.7 meters width which runs 100 meters ahead of cameras and a vehicle which runs on an adjacent lane do not exist in the same region, it has been recognized that the optimum number of picture elements is four for both lateral and longitudinal widths, namely 16 picture elements.

Accordingly, the description hereinafter is for an investigation of the coincidence of the left and right pictures when a picture is divided into a small region composed of 4×4 picture elements, and the CCD cameras 11a and 11b for a long distance.

Figure 1:
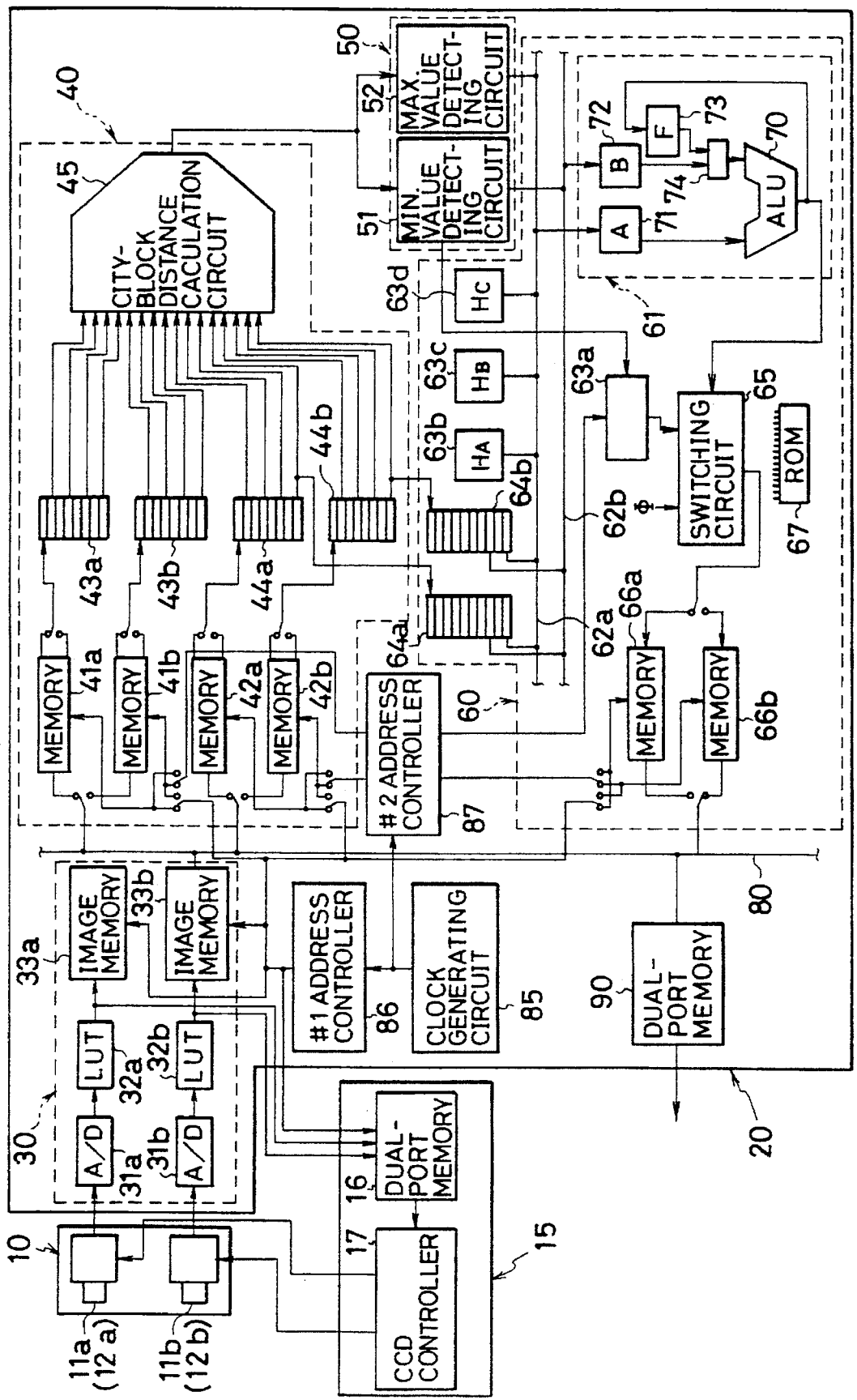

As shown in FIG. 1, the stereoscopical image processing apparatus 20 is provided with an image conversion part 30 for converting analogue pictures imaged by the stereoscopical optic system 10 into digital pictures, a city-block distance calculation part 40 acting as a coincidence calculation section which calculates the city-block distance H, shifting a picture element one by one and successively calculating the city-block distance H, a minimum/maximum value detecting section 50 for detecting the minimum value HMIN and the maximum value HMAX of the city-block distance H, and a deviation amount determining part 60 for determining the deviation amount x by checking for whether or not the minimum value HMIN obtained by the minimum/maximum value detecting section 50 is in coincidence for the left and right small regions.

In the image conversion part 30 described above, there are provided the A/D converters 31a and 31b corresponding with the CCD cameras 11a and 11b for the left and right pictures, and analog signals from the CCD cameras 11a and 11b are converted into digital signals by each of the A/D converters 31a and 31b. Further, the outputs from the A/D converters 31a and 31b are inputted into the look-up tables (LUT) 32a and 32b.

The A/D converters 31a and 31b have a brightness resolution of 8 bits for example, and the analog, image data from the CCD camera 11 are converted into digital image data having a required brightness gradation. More specifically, because, when brightness of an image is binarized to expedite the process, a large loss occurs in the amount of information for the calculation of coincidence on the right and left pictures, the brightness of each picture element is converted into a gray scale having a 256 gradation for example.

Further, the aforementioned LUT 32a and 32b are configured on a read-only memory (ROM). The LUT 32a and 32b have respective addresses composed of the same number of bits as those of data of the digital image converted by the A/D converters 31a and 31b. Also the data subjected to a brightness correction or a correction of intrinsic gain in the CCD amplifier are written on these LUTs 32a and 32b. The image data of 8 bits for example are corrected by the data written on the LUTs 32a and 32b so as to raise a contrast in a low brightness portion or correct a difference of characteristics between the left and right CCD cameras.

The digital image data corrected by the LUTs 32a and 32b are stored in the image memories 33a and 33b (represented as an image memory 33 if necessary) after corresponding addresses are assigned by a #1 address controller 86 described hereinafter and on the other hand they are also stored in the dual-port memory 16 of the shutter speed control apparatus 15 as a sample image. As described hereinafter, the image memory 33 is composed of a relatively low speed memory (therefore, low cost) because the data fetched into the city-block calculation section 40 is performed partially and repeatedly.

Next, the shutter speed control apparatus 15 will be described.

The shutter speed control apparatus 15 comprises a dual-port memory 16 in which addresses are assigned by the #1 address controller and a CCD controller 17 as sensitivity adjusting means for adjusting a sensitivity so as to be able to image a right picture by controlling a shutter speed of the CCD cameras 11a and 11b corresponding to the changes of illuminance outside of the vehicle. In the CCD controller 17, based on the sample image stored in the dual-port memory 16, it is judged whether or not the present shutter speed for each of the CCD cameras 11a and 11b is appropriate, and if it is judged to be inappropriate, the shutter speed of the CCD cameras 11a and 11b are respectively altered so as to eliminate a difference of sensitivity (hereinafter, referred to as shutter speed) between the right and left cameras.

In order to judge whether or not the present shutter speed is appropriate based on the sample image, it is necessary to determine which space (zone) and which data in the sample image is to be processed. Describing in more detail, as shown next, the approach for processing is determined by the combination of the items about space (zone) and those about the data process.

[1] Zone
  (1) Entire zone ... whole image data sampled
  (2) Zone dividing ... dividing the sampled image data into several zones (for example, zones I to VII as shown in FIG. 5)
  (3) Particular zone ... a particular zone in the sampled image

[2] Data Process
  (1) Arithmetical averaging ... arithmetically averaging all data within a subject zone
  (2) Minimum/Maximum method ... detecting a minimum and maximum value within a subject zone
  (3) Histogram method ... calculating a histogram for an entire subject zone In the preferred embodiment according to the present invention, a case where a zone dividing (2) with respect to the [1] Zone and an arithmetical averaging (1) with respect to the [2] Data process are introduced will be explained. Referring to FIG. 5 in which each divided zone indicates:

Zone I ... almost sky zone;
Zone II ... relatively long distance zone on the surface of a road;
Zone III ... relatively short distance zone on the surface of a road;
Zone IV ... a lane on the left of the vehicle;
Zone V ... a lane on the right of the vehicle;
Zone VI ... a left side area where a white marker on the presently traced lane exists;
Zone VII ... a right side area where a white marker on the presently traced lane exists;

With respect to each of the seven zones defined as above, a shutter speed changing map has been prepared beforehand by experiments or the like according to the process described below.

First, image pictures are taken under miscellaneous illuminance conditions, changing a shutter speed. Next, based on these image pictures, a shutter speed level, namely, a figure showing a correction level of the shutter speed (for example, 0 means no correction and 1 means raising a shutter speed by one step) is obtained, as shown in FIG. 8 to FIG. 12. More particularly, the shutter speed level is an indicative number for indicating how many steps of change should be made to the present shutter speed in order for an image picture having a given brightness to become one having a practically permissible brightness. Thus, a series of shutter speed levels are arranged on a map parameterizings shutter speed and brightness for each zone.

Accordingly, if a present shutter speed and an arithmetically averaged value of brightness data for each zone of the sample image are known, a proper shutter speed level can be obtained by referring to the above shutter speed changing maps.

Thus, the shutter speed levels of the left and right CCD cameras 11a and 11b can be controlled properly, whereby not only a real time adjustment of brightness can be achieved even at a sudden change of illuminance such as when a vehicle comes into a tunnel but also a discrepancy of brightness between the left and right CCD cameras can be prevented because there is no diaphragm mechanism therein. Further, the distance detecting system according to the present invention is also operated during a night running.

For example, when the present shutter speed of the cameras is 1/1000 sec, supposing an averaged value of brightness per zone to be as shown in FIG. 7, the required shutter speed levels SSL (I) to SSL (VII) are respectively as follows:

SSL (I)=+1
SSL (II)=−1
SSL (III)=0
SSL (IV)=−1
SSL (V)=−1
SSL (VI)=0
SSL (VII)=0

A sum of SSL (I) to SSL (VII), ΣSSL is equal to −2 and consequently a proper shutter speed becomes 1/250 sec (lowered by two levels).

On the other hand, the city-block distance calculation part 40 of the stereoscopical image processing apparatus 20 is connected to the two sets of the input buffer memories 41a and 41b via a common bus 80 and the two sets of the input buffer memories 42a and 42b via the common bus 80.

These input buffer memories 41a, 41b, 42a and 42b are a high speed type of memories corresponding to the speed of the city-block distance calculation since they have relatively small capacity of memories and further each of them can do an input/output control independently. Further, based on the address signals generated from the #1 address controller 86 according to a clock-signal supplied by a clock generating circuit 85, the same address number is assigned to these input buffer memories 41a, 41b, 42a and 42b, the picture memories 33a and 33b, and the dual-port memory 16.

The input buffer memories for the left image picture 41a and 41b are connected with two sets of shift registers (each set composed of 8 stages, for example) 43a and 43b and similarly, the input buffer memories for the right image picture 42a and 42b are connected with two sets of shift registers (each set composed of 8 stages, for example) 44a and 44b. Further, these 4 sets of shift registers 43a, 43b, 44a and 44b are connected to the city-block distance calculation circuit 45 for calculating a city-block distance. The data transmission among these 4 sets of shift registers and the above input buffer memories is controlled by a #2 address controller 87.

Furthermore, the shift registers for the right image picture 44a and 44b are connected to 2 sets of shift registers 64a and 64b (each set composed of 10 stages) in the deviation amount determining section 60 described hereinafter. When the data for the next small region are started to be transferred, the former data which have been used for the calculation of city-block distances H are transmitted to these shift registers 64a and 64b and used for determining the deviation amount x.

Figure 13:
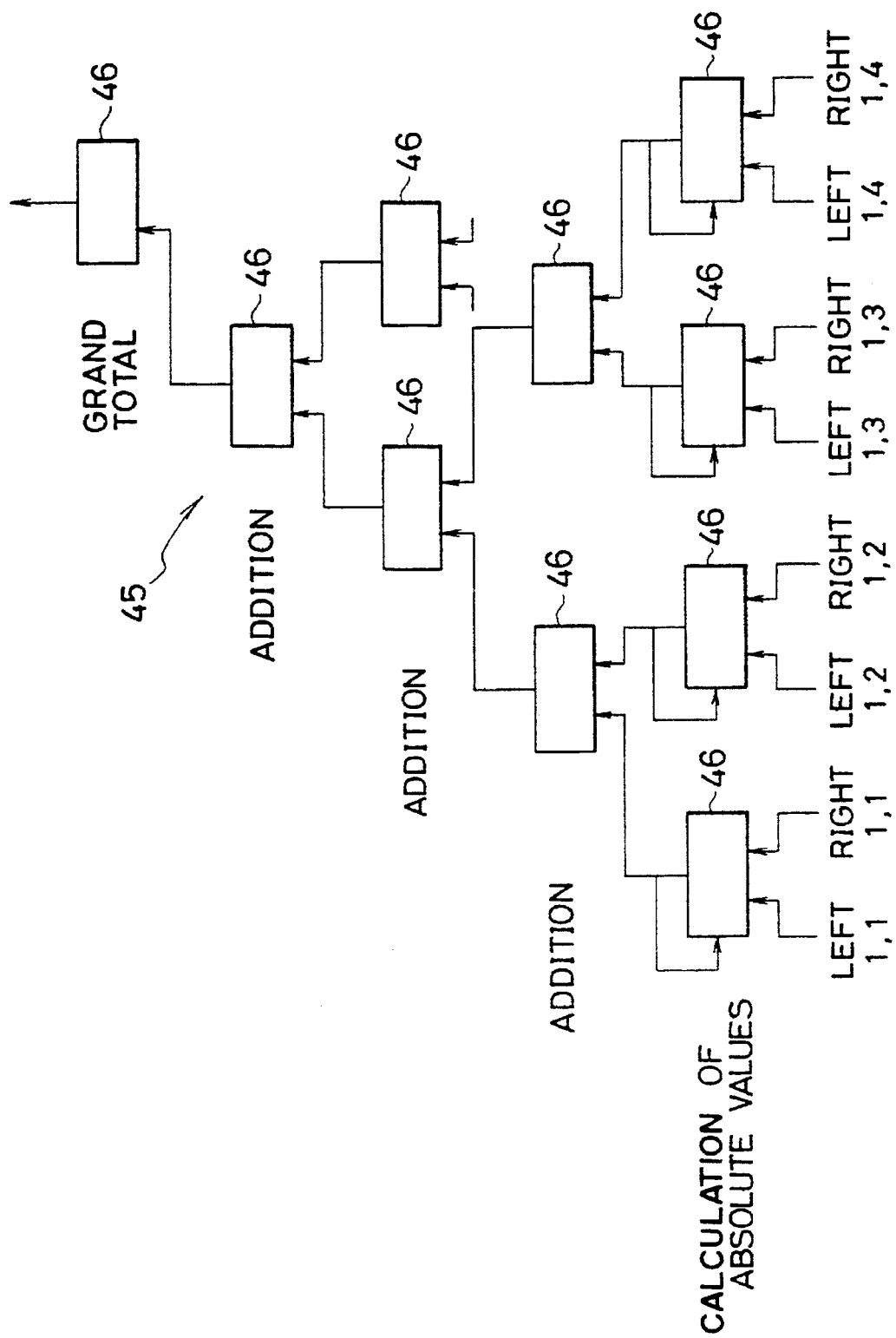

Further, the city-block distance calculation circuit 45 is combined with a high speed CMOS type calculator 46 which is arranged on one-chip by combining a plurality of adders with input/output latches. As shown in FIG. 13, the city-block distance calculation circuit 45 has a pipe-line construction connecting 16 pieces of the calculator 46 in a pyramid shape. The first stage of this pyramid construction is for calculating absolute values, the second stage to the fourth stage are a first adder, a second adder and a third adder respectively, and the last stage is an adder for calculating a grand total. Because of this construction, the calculator can process so much data of 8 picture elements portion simultaneously. It should be noted that a right portion of the first and second stages is omitted in FIG. 13.

The aforementioned minimum/maximum values detecting section 50 comprises a minimum value detecting circuit 51 for detecting a minimum value $H_{MIN}$ of the city-block distance H and a maximum value detecting circuit 52 for detecting a maximum value $H_{MAX}$ of the city-block distance H and has a construction employing two pieces of the calculator 46 mentioned before, one of which is for detecting a minimum value and another for detecting a maximum value. Further, minimum/maximum values detecting section 50 is operated synchronously with an output of the city-block distance H.

Figure 14:
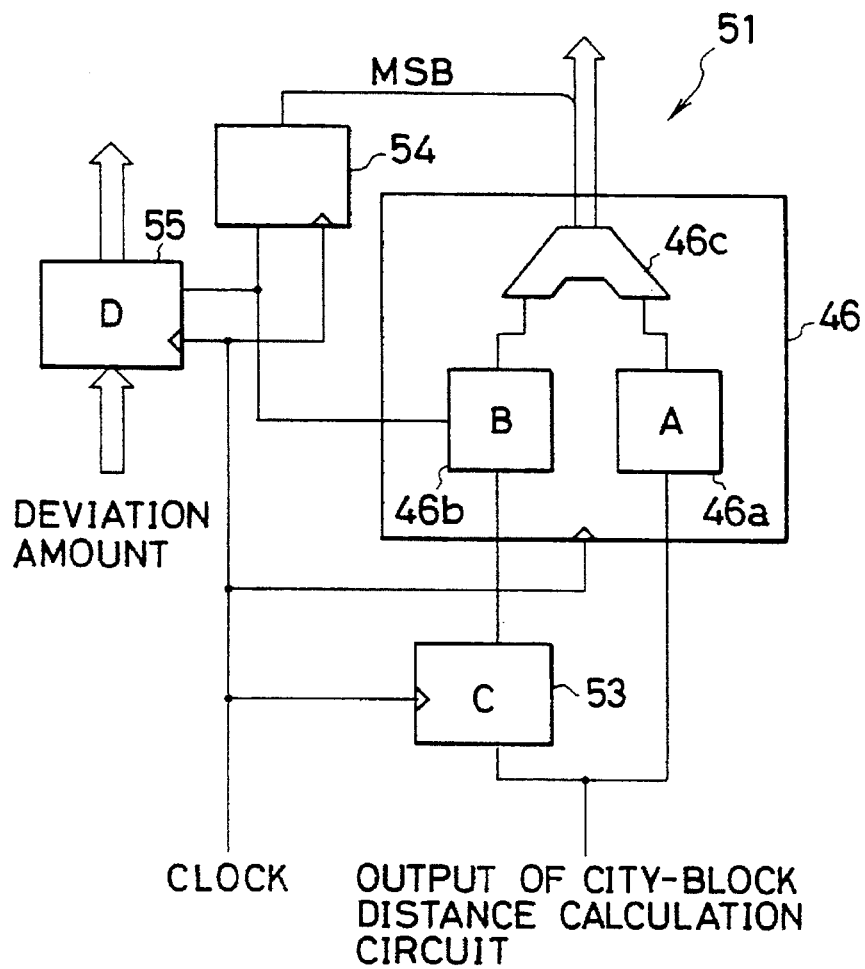

As illustrated in FIG. 14, the minimum value detecting circuit 51 is composed of the calculator 46 having a register A 46a, a register B 46b and an arithmetic and logic unit (ALU) 46c therein, a latch C 53, a latch 54 and a latch D 55 which are connected with the calculator 46. An output from the city-block distance calculation circuit 45 is inputted to the register B 46b through the register A 46a and the latch C 53 and a most significant bit (MSB) of the output from the ALU 46 is outputted to the latch 54. An output from the latch 54 is inputted to the register B 46b and the latch D 55. Namely, a half-way result of the minimum value calculation in the calculator 46 is stored in the register B 46b and on the other hand, the deviation amount at this moment x is stored in the latch D 55.

With respect to the maximum value detecting circuit 52, the composition is the same as the one of the minimum value detecting circuit 51 excepting that a logic is reversed and a deviation amount x is not stored.

As described before, a city-block distance H is calculated, each time when a picture element of the left picture is shifted by one element, leaving a given small area of the right picture at a fixed position. Each time when this calculated city-block distance H is outputted, it is compared with a maximum value $H_{MAX}$ and a minimum value $H_{MIN}$ obtained until now and those maximum or minimum values are updated if necessary. When the last city-block distance is to be calculated for a small region of the right picture is finished, the maximum and minimum values of the city-block distance H, $H_{MAX}$ and $H_{MIN}$ are obtained with respect to the given small region of the right picture.

The aforementioned deviation amount determining part 60 is a relatively small scale of the RISC processor which comprises a calculator 61 of the primary device thereof, two data buses with a 16 bits width, 62a and 62b, a latch 63a for holding a deviation amount x, a latch 63b for holding a threshold $H_A$ as a first specified value, a latch 63c for holding a threshold $H_B$ as a second specified value, a latch 63d for holding a threshold $H_C$ as a third specified value, two sets of the shift registers 64a and 64b for holding image data of the right picture, a switching circuit 65 for outputting a deviation amount "x" or "0" responsive to the output from the calculator 61, output buffer memories 66a and 66b for temporarily storing the outputted data, and a ROM 67 with a 16 bits width on which an operational timing data for the circuit and a control program to operate the calculator 61 are written.

Further, the calculator 61 above described comprises an ALU 70 which is a primary device thereof, a register 71, a register 72, a register 73 and a selector 74. The above data bus 62a (hereinafter, referred to as a bus A 62a) is connected to the register A 71 and also the data bus 62b (hereinafter, referred to as a bus B 62b) is connected to the register B 72. Furthermore, the aforementioned switching circuit 65 is operated according to the result of the calculation of the ALU 70 so as to store the deviation amount "x" or "0" in the buffer memories 66a and 66b.

The above bus A 62a is connected with the latches 63b, 63c and 63d for holding the thresholds $H_A$, $H_B$ and $H_C$ respectively, and with the maximum value detecting circuit 52. Further, the bus B 62b is connected with the minimum value detecting circuit 51 and the aforementioned shift registers 64a and 64b are connected to the bus A and the bus B respectively.

The above switching circuit 65 is connected with the calculator 61 and the minimum value detecting circuit 51 via the latch 63a. The switching circuit 65 provides a switching function for switching an output to the output buffer memories 66a and 66b according to the result of a judgment when the calculator 61 judges three conditions as described hereinafter.

In the deviation amount detecting part 60, it is checked whether or not the minimum value $H_{MIN}$ of the city-block distance H really indicates a coincidence of the right and left small areas and, only when the three conditions are satisfied, the deviation amount x between two corresponding picture elements is outputted. That is to say, a required amount of deviation x is an amount of deviation at the moment when the city-block distance H becomes minimum and accordingly the deviation amount x is outputted when following three conditions are met and the value "0" which means no data is outputted when they are not met.

Condition 1: $H_{MIN} \leq H_A$ (when $H_{MIN} > H_A$, distance detection is not available)

Condition 2: $H_{MAX} - H_{MIN} \geq H_B$ (a condition to check whether or not an obtained minimum value is a fake value caused by flickers of noises; this condition is also effective in case where an object has a curved surface whose brightness varies gradually, Condition 3: brightness difference between two adjacent picture elements of lateral direction within a small area of the right picture>$H_C$ (bringing $H_C$ to a high value, an edge detection can be available, however, in this condition $H_C$ is determined at a much lower level than ordinarily determined level for edge detection; this condition is based on a principle that a distance detection can not be performed at a portion having no brightness change.

The distance distribution information outputted from the deviation determining part 60 is written through a common bus 80 in the dual-port memory 90 which is an interface for an external device such as a roads/obstacles recognition apparatus.

Next, an operation of the distance detecting apparatus 2 will be described.

Figure 17:
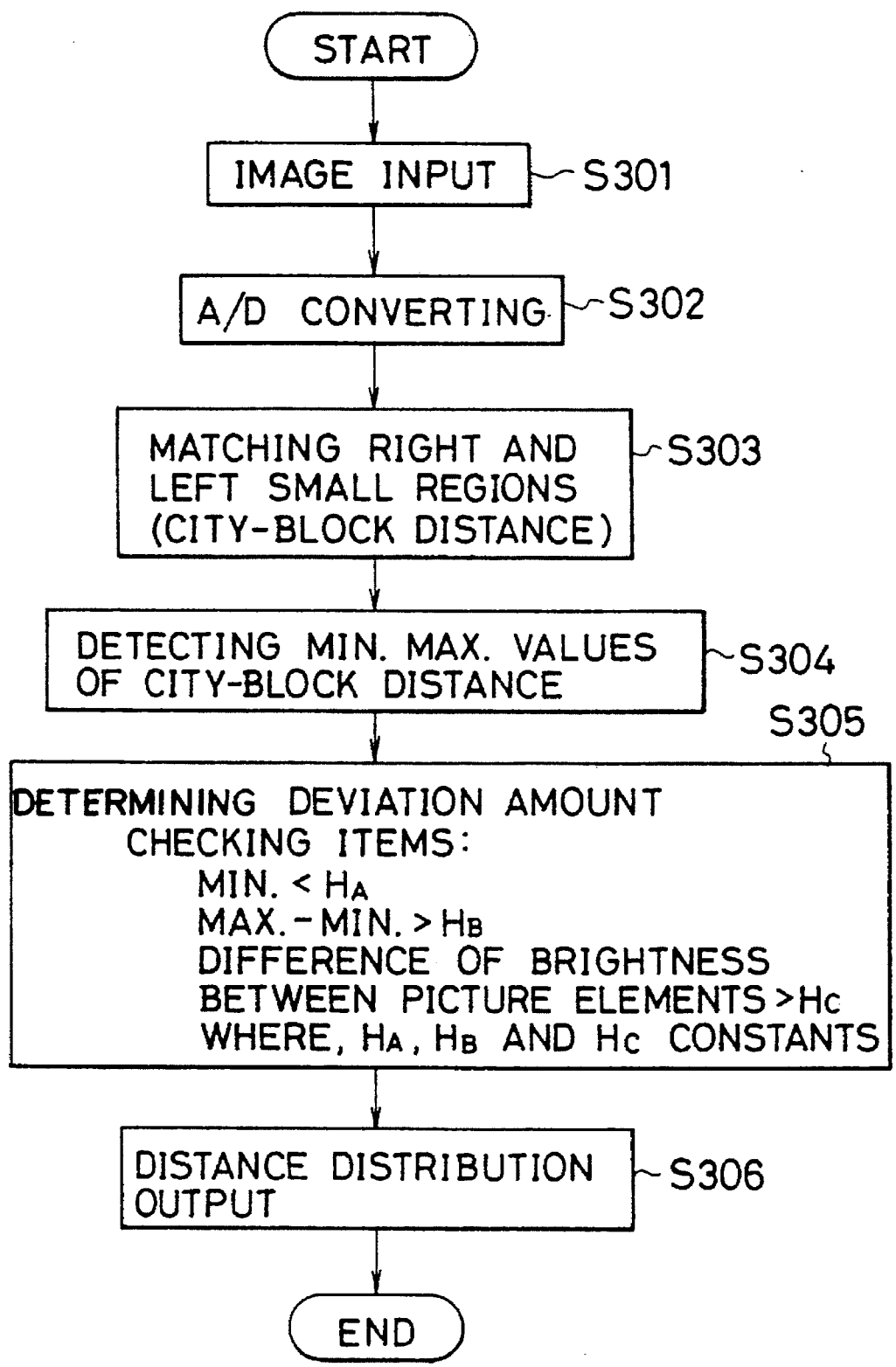

FIG. 17 is a flowchart showing a distance detection process in the stereoscopical image processing apparatus 20. First, at a step S301, when image pictures taken by the left and right CCD cameras 11a and 11b are inputted, at the next step S302 the inputted analogue images are converted into digital signals by the A/D converters 31a and 31b. Next, in the LUTs 32a and 32b, these digitized image data are subjected to several processes such as raising the contrast of a low brightness portion, compensating characteristics of the left and right CCD cameras or the like and then they are recorded in the image memories 33a and 33b. On the other hand, they are also recorded as a sample image in the dual-port memory 16 of the shutter speed control apparatus 15.

It is not necessary that the image picture memorized in the image memories 33a and 33b should be an entire picture. The size of the image picture, namely the number of lines of the CCD elements, memorized at one time may be as much as needed for the following process. Further, what portion of the lines is memorized is dependent on the objects of a distance detection system. In this embodiment, the image picture memorized is, for example, a middle portion of 200 lines within 485 lines altogether. Furthermore, the updating speed of the memorized image picture may be reduced as much as needed in accordance with an object or a performance of the apparatus. In this embodiment, the updating speed is, for example, one picture per 0.1 second (one picture for every three pictures in a television).

The image picture recorded in the dual-port memory 16 of the shutter speed control apparatus 15 is checked for whether or not the shutter speed of the left and right CCD cameras 11a and 11b is proper and if it is not proper the shutter speed is corrected to a proper one. That is to say, even when an outside illuminance is changed largely, the shutter speed of both cameras is properly adjusted, thereby the image pictures, with brightness difference between the left and right CCD cameras, are recorded in the image memories 33a and 33b respectively.

Next, a shutter speed control process according to the shutter speed control apparatus 15 will be described based on the flowcharts in FIG. 15 and FIG. 16.

Figure 15:
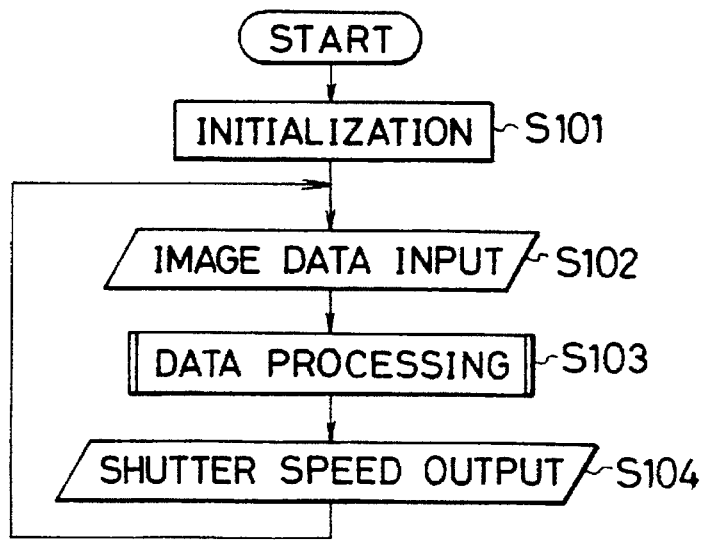

Referring now to FIG. 15, this is a flowchart showing a main routine in the CCD controller 17. After an initialization at S101, a sample image is inputted from the dual-port memory 16 at S102. At the next step S103, a subroutine for data processing is carried out. In this subroutine an averaging of the image data and a calculation of the proper shutter speed are performed. Next, the process goes to S104 where the calculated shutter speed is outputted and then the process is returned to S102 from which the same process is repeated.

Figure 16:
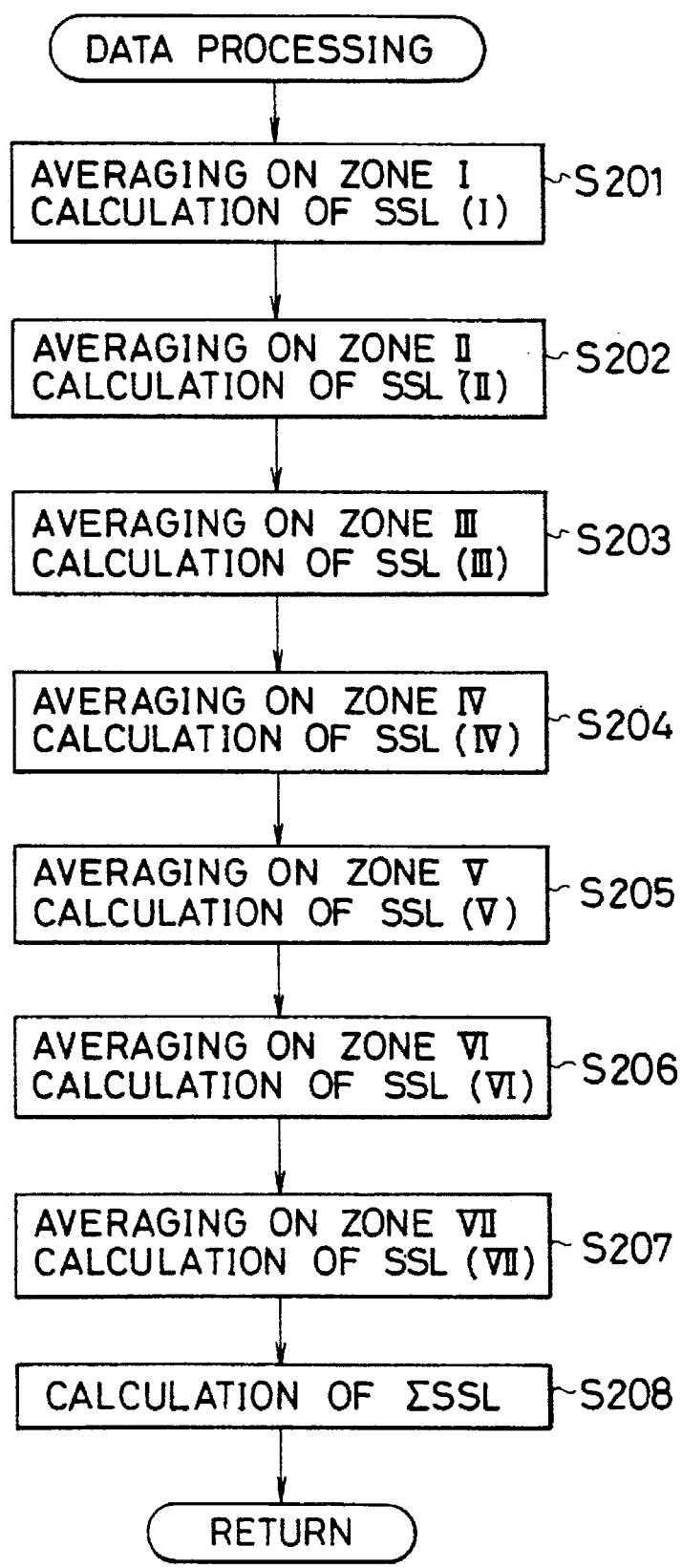

Describing the process in the data processing subroutine in more detail as shown in FIG. 16, first, the brightness of the image is averaged for every zone of the image picture, namely, Zones I, II, III, IV, V, VI and VII as shown in FIG. 5. Then, based on this averaged brightness data and the present shutter speed, a shutter speed level corresponding to each zone, SSL (I), SSL (II), SSL (III), SSL (IV), SSL (V), SSL (VI) and SSL (VII) is read out from a corresponding map as indicated in FIGS. 8 to 12 respectively. Then, the process goes to S208 where a grand total ΣSSL of the shutter speed levels thus obtained is calculated and it is returned to the main routine.

When the picture images of the left and right CCD cameras 11a and 11b are recorded in the image memories 33a and 33b respectively after being subjected to the shutter speed control and the brightness adjustment as mentioned above, at 303 the left and right image data are written into the input buffer memories 41a, 41b, 42a and 42b from the left and right image memories 33a and 33b via the bus line 80 and a matching, namely, a check for coincidence is carried out between the left and right pictures written thereinto. The image data are read into the input buffer memories by several lines altogether, for example 4 lines altogether for each picture.

The data writing into the buffer memories from the image memories and the data writing into the shift registers from the buffer memories are performed alternately between two buffer memories for the left or right picture. For example, in the left picture, while the present data are written into the buffer memory 41a from the image memory 33a, the previous data are written into the shift register 43b from the buffer memory 41b and at the next timing while the next data are written into the the buffer memory 41b from the image memory 33b, the data written at the previous timing are written into the shift register 43a from the buffer memory 41a. Similarly, in the right picture the same operations are performed.

Figure 18:
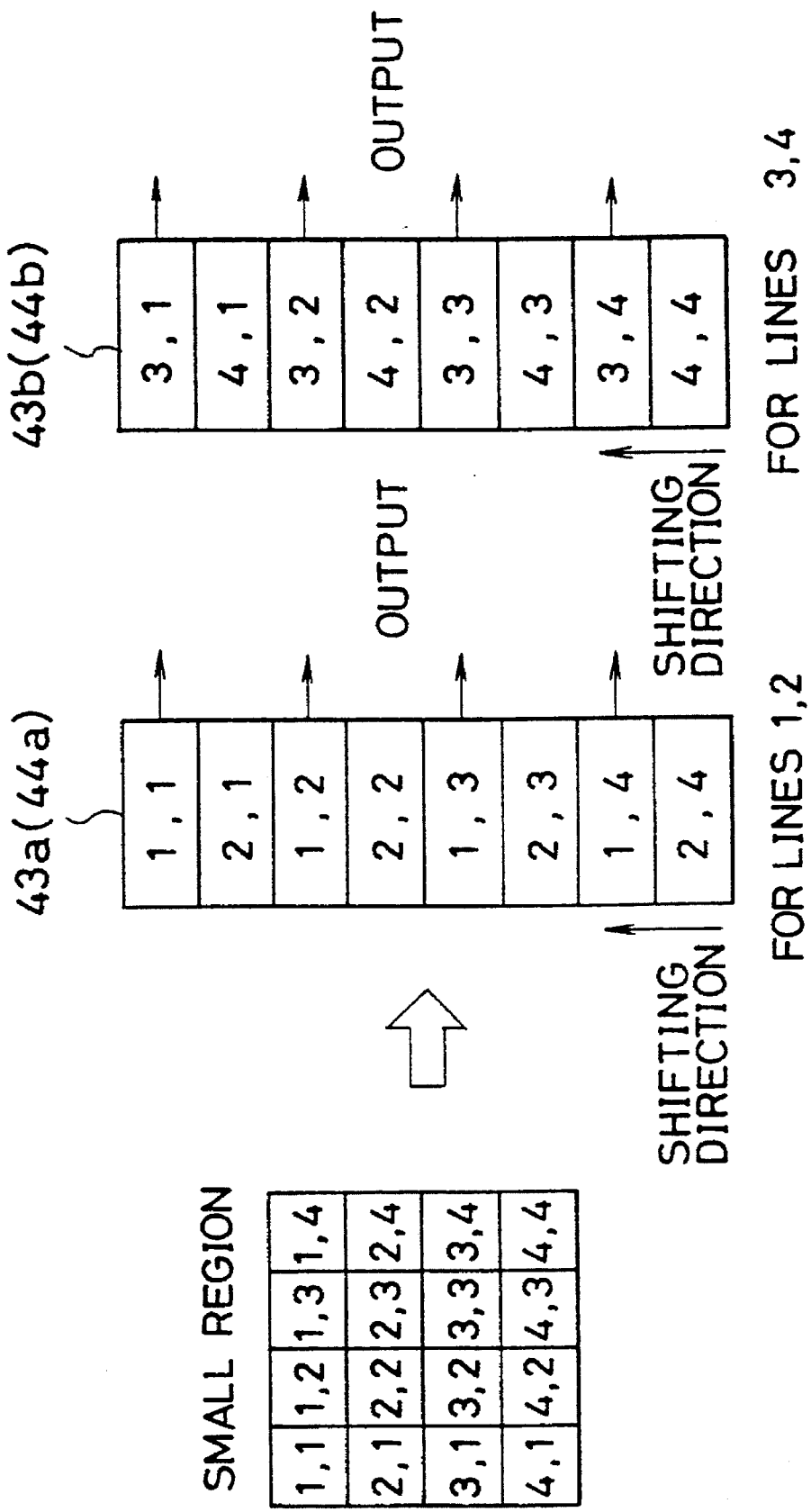

Further, as shown in FIG. 18, the image data of a small region composed of 4×4 picture elements for the left (right) picture are arranged in such a manner as (1, 1) . . . (4, 4). These image data enter one by one into the shift registers 43a (44a) for the lines 1, 2 of the small region and the shift registers 43b (44b) for the lines 3, 4 in the order of an odd-numbered line to an even-numbered line as illustrated in FIG. 18.

The shift registers 43a, 43b, 44a and 44b have respectively an independent data transfer line. Therefore, the data of 4×4 picture elements are transferred in eight clocks for example. Then, these shift registers 43a, 43b, 44a and 44b output simultaneously the contents of the even numbered steps of the eight steps to the city-block distance calculation circuit 45 and when the calculation for the city-block distance H starts, the data of the right picture are held in the shift registers 44a and 44b, and the data of odd-numbered lines and even-numbered lines are alternately outputted for one clock signal. On the other hand, the data of the left picture are continued to be transferred to the shift registers 43a and 43b, and while the data of odd-numbered lines and even-numbered lines are alternately outputted, the data which are displaced in the direction of one picture element to the right are rewritten for every two clocks. This is repeated until a portion of 100 picture elements has been displaced (for example, 200 clocks).

When the whole data are completed to be transferred with respect to a small region, the contents of the right picture address counter (head address of the small region of the next 4×4 picture elements) are set in the left picture address counter in the #2 address controller 87 and the processing for the next small region is started.

Figure 19:
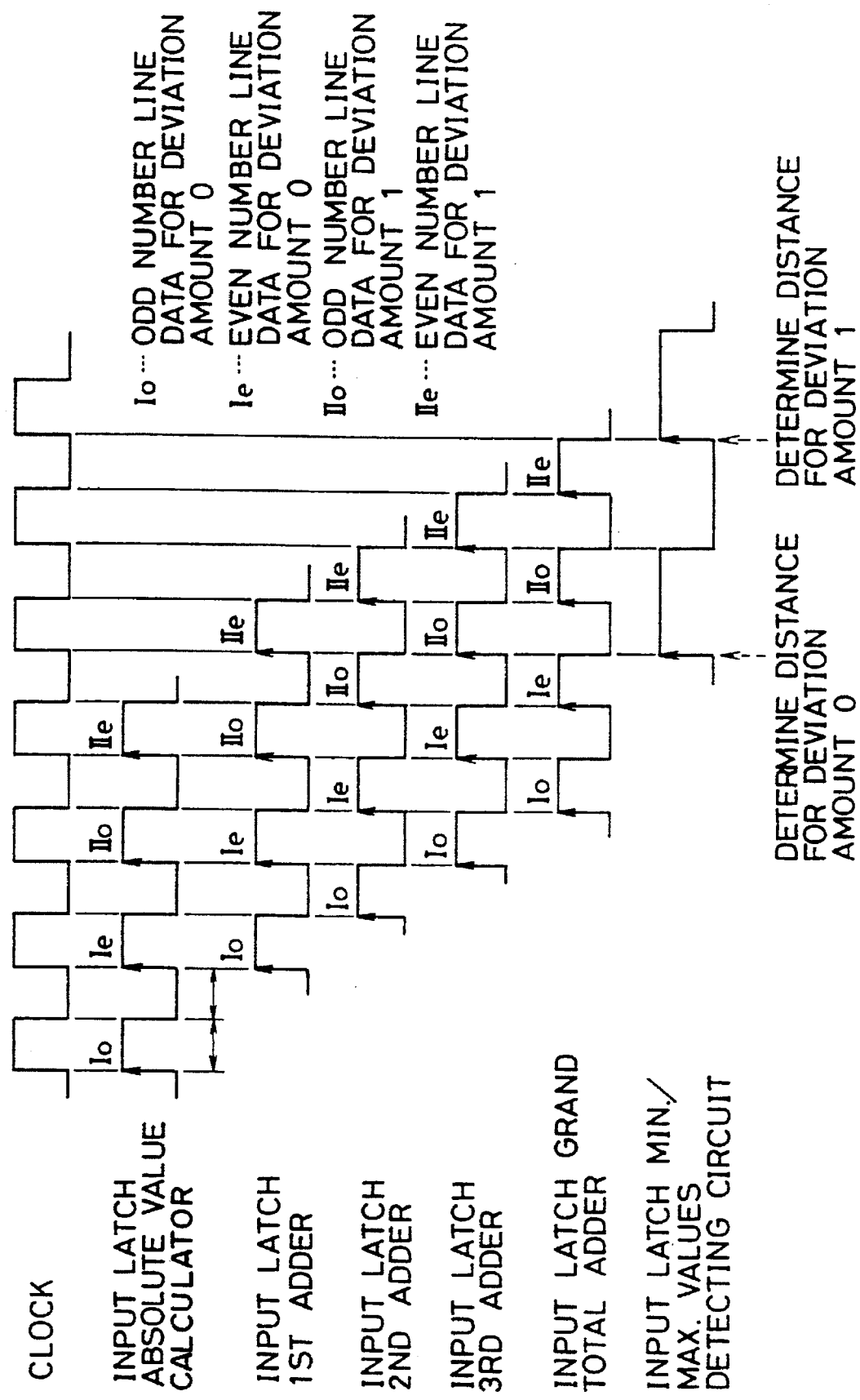

In the city-block distance calculation circuit 45, as shown in a timing chart of FIG. 19, the data of 8 picture elements portion are first inputted to the absolute value calculator of the initial stage of the pyramid structure and the absolute value of the brightness difference between the left and right pictures is calculated. More specifically, when the brightness of the corresponding right picture element is subtracted from the brightness of the left picture element and the result of this subtraction is negative, changing the calculation command and again performing subtraction by replacing the subtrahend with the minuend, the absolute value is calculated. Accordingly, subtraction is performed twice in the initial stage in some case.

Next, when the initial stage is passed, the first to third adders from the second to fourth stages add the two input data inputted simultaneously and output the result. Further, the two consecutive data are added in the grand total calculator of the final stage where the grand total is calculated and a required city-block distance H for a 16 picture elements portion is outputted to the minimum/maximum values detecting section 50 in every two clocks.

Then, the process goes to S304 where a maximum value $H_{MAX}$ and a minimum value $H_{MIN}$ are detected with respect to the city-block distance H calculated at the step S303. As described before, the detection of the maximum value $H_{MAX}$ and the minimum value $H_{MIN}$ are exactly the same other than that they use mutually inverted logic and the deviation amount x is not retained, therefore a following description is only about the detection of the minimum value $H_{MIN}$.

First, the city-block distance H initially outputted (H at the deviation amount x=0) is inputted to the register B 46b of the ALU 46 via the latch C 53 of the minimum value detection circuit 51 as shown in FIG. 14. The city-block distance H outputted at the next clock (H at the deviation amount x=1) is inputted to the register A 46a of the ALU 46 and the latch C 53, and at the same time the comparison calculation with the register B 46b is started in the ALU 46.

If the result of the comparison calculation in the ALU 46 indicates that the contents of the register A 46a are smaller than those of the register B 46b, the contents of the latch C 53 (namely, the contents of the register A 46a) are sent to the register B 46b and the deviation amount x of this time is retained in the latch D 55. Further, with this clock, the city-block distance H (H at the deviation amount x=2) is inputted to the register A 46a and to the latch C 53 at the same time, and then the comparison calculation is started again.

Thus, the minimum value during calculation is always stored in the register B 46b and the deviation amount x of this time is always retained in the latch D 55, with calculation continuing until the deviation amount x becomes 100. When the calculation is finished (i.e., in one clock after the output of the final city-block distance H), the contents of the register B 46b and the latch D 55 are written into the deviation amount determining section 60.

During that time, the initial value of the next small region is read into the city-block distance calculation circuit 45 so that a time loss is prevented since a new calculation result is obtained in every two clocks owing to the pipe line structure, although otherwise it takes four clocks to calculate one city-block distance H.

Figure 20:
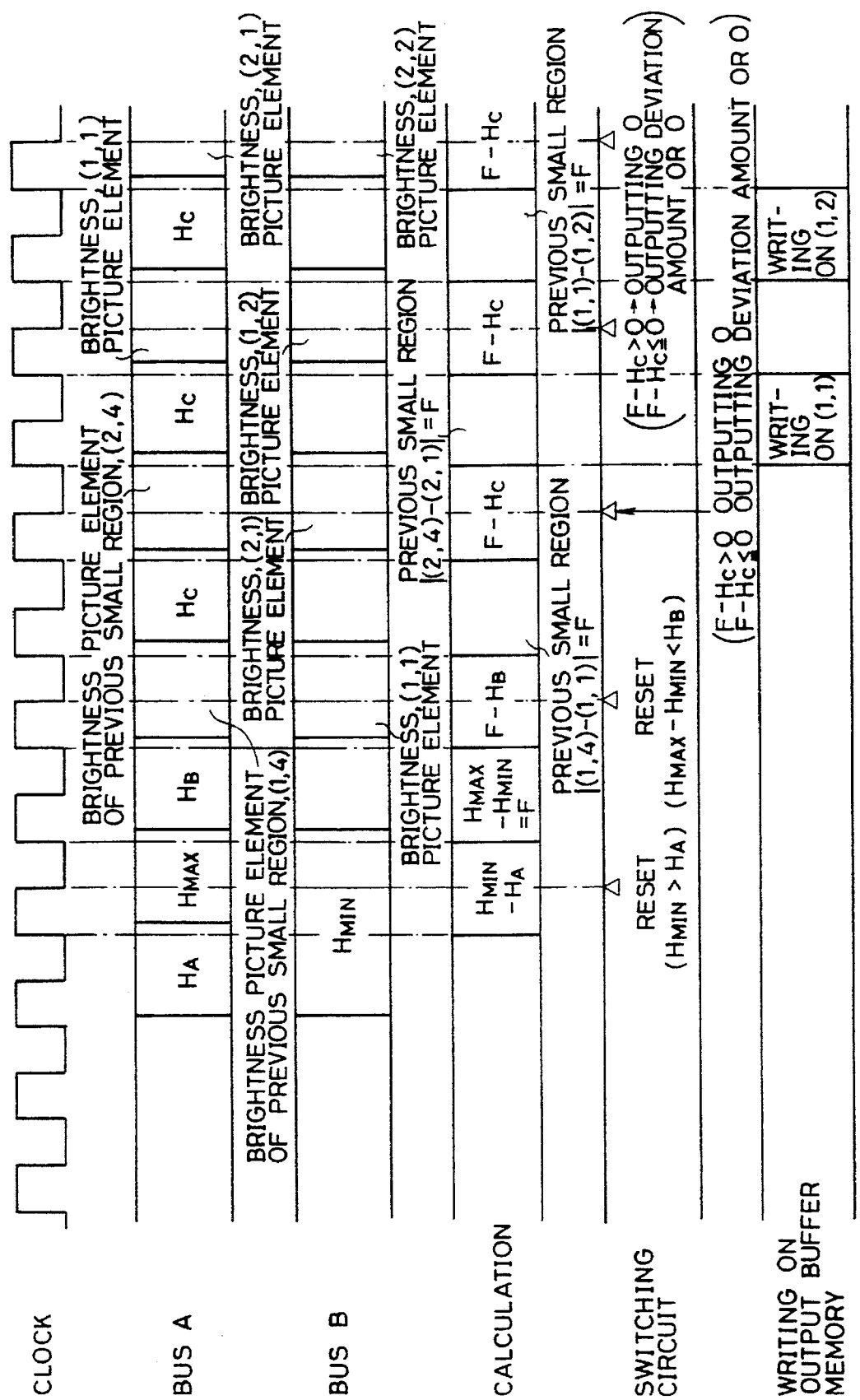

At a step S305, the minimum value $H_{MIN}$ and the maximum value $H_{MAX}$ of the city-block distance H are determined, the deviation amount determining section 60 checks the three conditions mentioned before, and the deviation amount x is determined. More specifically, as indicated in the timing chart of FIG. 20, the minimum value $H_{MIN}$ is latched to the register B 72 of the calculator 61 via the bus B 62b and on the other hand the threshold $H_A$ which is compared with the value in the register B 72 is latched to the register A 71 via the bus A 62a. Then, in the ALU 70, the minimum value $H_{MIN}$ and the threshold $H_A$ are compared and if the minimum value $H_{MIN}$ is larger than the threshold $H_A$, then the switch circuit 65 is reset, and 0 is outputted regardless of the results of the later checks.

The maximum value $H_{MAX}$ is then latched to the register A 71, and the difference between the maximum value $H_{MAX}$ and the minimum value $H_{MIN}$ retained in the register B 72 is calculated, and that result is outputted to the register F 73. With the next clock, the switching circuit 65 is reset if the contents of the register F 73 are smaller than the threshold $H_B$ latched to the register A 71.

The calculation of the brightness difference between the adjacent picture elements is started at the next clock. The two pairs of the shift registers 64a and 64b which preserve the brightness data therein have a ten-staged configuration, and are connected to the latter stage of the shift register 44a for the first and second lines of the city-block distance calculation section 40 and the shift register 44b for the third and fourth lines of the city-block distance calculation section 40. The output of these shift registers is taken from the final stage and from the stage coming before by two stages and are outputted to the bus A 62a and the bus B 62b respectively.

When the calculation of the brightness difference is started, brightness data of each picture element in the small region are retained in each stage of the shift registers 64a and 64b, and first, the brightness data of the first line of the fourth column of the previous small region and that of the first line of the first column of the present small region are latched to the register A 71 and the register B 72 of the calculator 61.

Then, the absolute value of the difference between the contents of the register A 71 and those of the register B 72 is calculated and the results are stored in the register F 73. Further, at the next clock, the threshold $H_C$ is latched to the register A 71 and compared with the value of the register F 73.

If the contents of the register F 73 (absolute value of the brightness difference), as a result of the comparison in the calculator 61, are larger than the contents of the register A 71 (threshold $H_C$), then the switching circuit 65 outputs either the deviation amount x or "0" and if the contents of the register F 73 is smaller than those of the register A 71, then the switching circuit 65 outputs "0". These outputted values are written into an address representing the first column of the first row of the small region of the output buffer memories 66a and 66b.

While the comparison between the threshold HC and the brightness difference between adjacent picture elements is being performed in the calculator 61, the shift registers 64a and 64b are shifted one stage. Then, the calculation is started with respect to the brightness data of the second line of the fourth column of the previous small region and that of the second line of the first column of the present small region. Thus, the calculation with respect to the third line and the fourth line is performed similarly after the calculation is performed alternately with respect to the first line and the second line of the small region.

During the calculation, the final stage and the initial stage of the shift registers 64a and 64b are connected with each other in a ring type shift register. Therefore, when the shift clock has been added twice after a completion of the calculation on the entire small region, the contents of the register are returned to the state before calculation, and when the sending of the brightness data of the next small region has been finished, the data of the fourth column of the present small region are stored in the final stage and the stage before that.

In this manner, while the calculation for determining the deviation amount is performed, the data to be processed next are prepared in the buses A 62a and 62b and the result is written, so that one data can be processed by only two clocks necessary for executing the calculation. Accordingly, the entire calculations can be completed in 43 clocks for example, even including checks of the minimum value $H_{MIN}$ and the maximum value $H_{MAX}$ which are initially performed.

That is to say, there is a sufficient allowance for the time necessary to determine the minimum value $H_{MIN}$ and the maximum value $H_{MAX}$ of the city-block distance H with respect to a given small region, so it is possible to have some additional functions.

Then, when the deviation amount x is determined, at S306 it is outputted as distance distribution information from the output buffer memories 66a and 66b to the dual-port memory 90, and thus the processing in the stereoscopical picture processing apparatus 20 is finished. These output buffer memories 66a and 66b have a capacity of a four-line portion for example which is the same as in the input buffer memories 41a, 41b, 42a and 42b. Further, the distance distribution information is sent from one (either 66a or 66b) to the dual-port memory 90 while a writing is being carried out.

Figure 21:
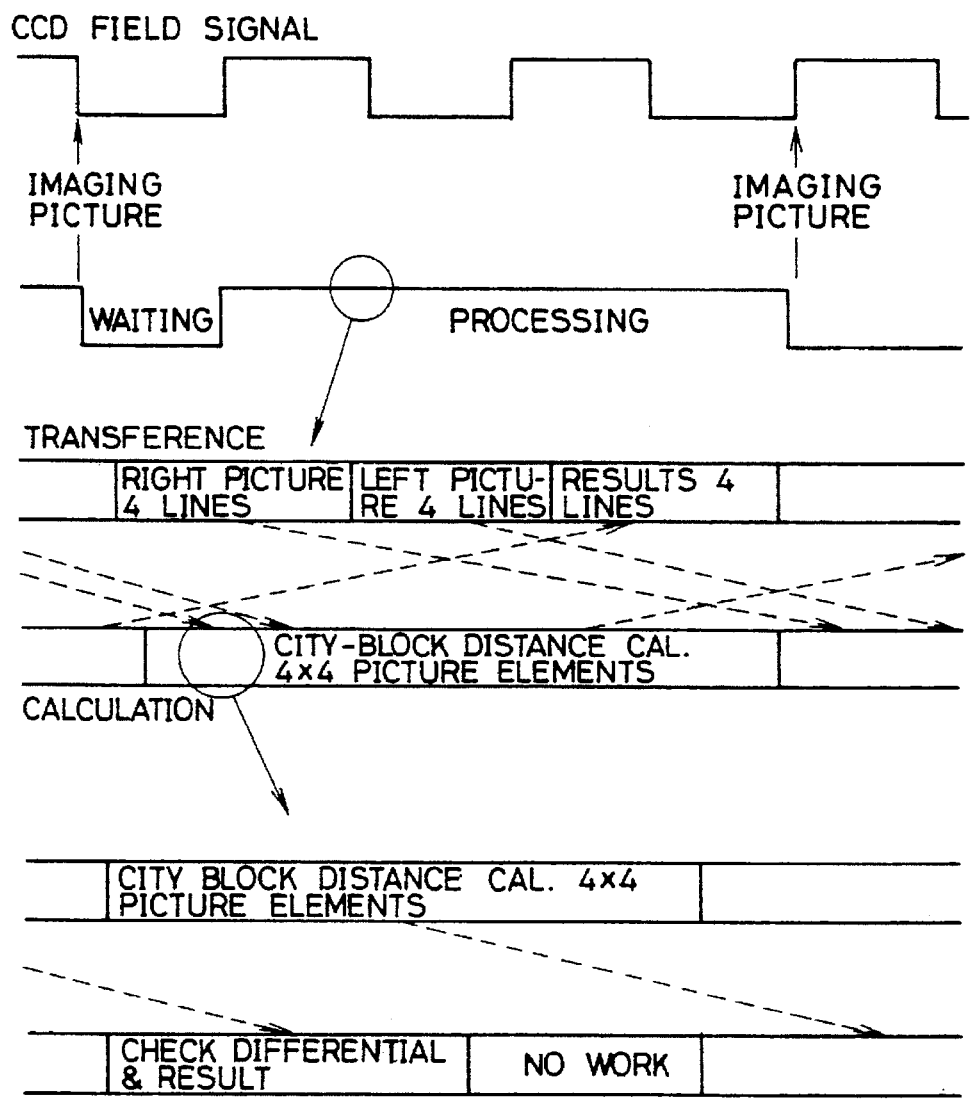

Next, the timing of the entire system will be described according to the timing chart shown in FIG. 21.

First, a field signal from the left and the right CCD cameras which are operated synchronously is inputted to the image memories 33a and 33b in every 0.1 seconds (ratio of one picture per three pictures).

Next, upon a completion signal for image take-in, the block-by-block transference is started for every four-lines portion. This transference is performed with respect to three blocks, the right picture, the left picture and the distance distribution picture in this order.

On the other hand, during this time, the deviation amount x is calculated with respect to one of input/output buffer memories and the data transference is performed to the other of input/output buffer memories after a predetermined waiting time in consideration of the calculation time for the deviation amount x.

As described before, the calculation of the city-block distance H is performed 100 times, namely for a 100 pictures portion, with respect to a small region of 4×4 picture elements of the right picture. While the city-block distance H is being calculated for a single small region, the deviation amount x of the previous small region is outputted as distance distribution information after miscellaneous checks.

In a case where there are 200 lines, for example, in the image picture to be processed, the processing for a four lines portion is repeated 50 times. Further, there are the processing time of the four lines portion for transferring the initial data at the beginning of the calculation and the processing time of the four lines portion for transferring the last result to the image recognition section after a completion of the calculation, therefore, the additional processing time of the eight lines portion in total is needed. According to the result of an actual operation on the circuit, the total processing time from the start of the data transmission of the initial input image to the completion of the data transmission of the last distance distribution information is 0.076 seconds.

Figure 22:
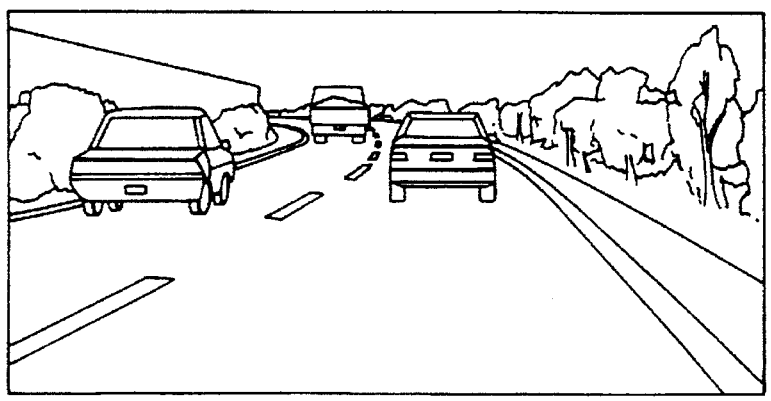
Figure 23:
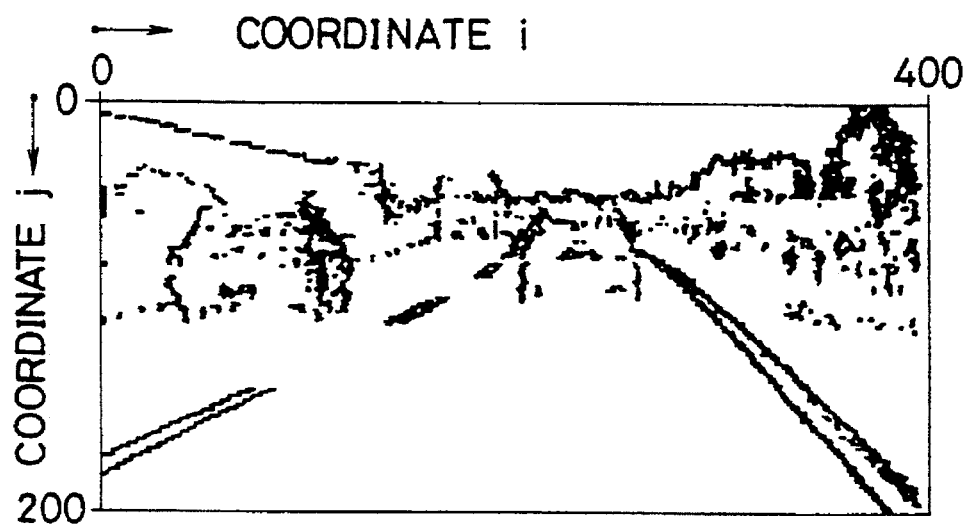

The distance distribution information outputted from the aforementioned stereoscopical image processing apparatus 20 has a configuration (distance image picture) like a picture. For example, the picture taken by the left and right CCD cameras 11a and 11b as shown in FIG. 22 becomes a picture as shown in FIG. 23 when it has been processed by the stereoscopical image processing apparatus 20. The example of picture in FIG. 23 has a picture size composing of 400 (laterally)×200 (longitudinally) picture elements and black dots therein indicate portions having a rather large brightness difference between adjacent picture elements in the direction of left and right within the picture of FIG. 22. The distance data are included in these black dots. The coordinates system in the distance picture has the origin of the coordinate at the above left corner, the lateral coordinate axis "i" and the longitudinal coordinate axis "j" with a unit of one picture element, as shown in FIG. 23.

Since the picture in FIG. 22 is a picture taken by the left and right CCD cameras 11a and 11b with a proper shutter speed obtained under the control of the shutter speed control apparatus 15, the distance picture in FIG. 23 which has been obtained by processing the data of the image memory 33 recording the picture indicates an accurate distance distribution, even when illuminance of the outside has been suddenly changed.

Thus, from the distance picture, the three dimensional position of the object corresponding to each picture element in the XYZ space can be calculated based on the camera position, the focal length of the camera and other parameters, whereby an accurate distance to the object outside of the vehicle can be detected without loss of information quantity.

The above calculation of the three dimensional position may be performed within the stereoscopical image processing apparatus 20 and the data form outputted from the stereoscopical image processing apparatus 20 may be determined according to the interface to be connected thereto.

Figure 24:
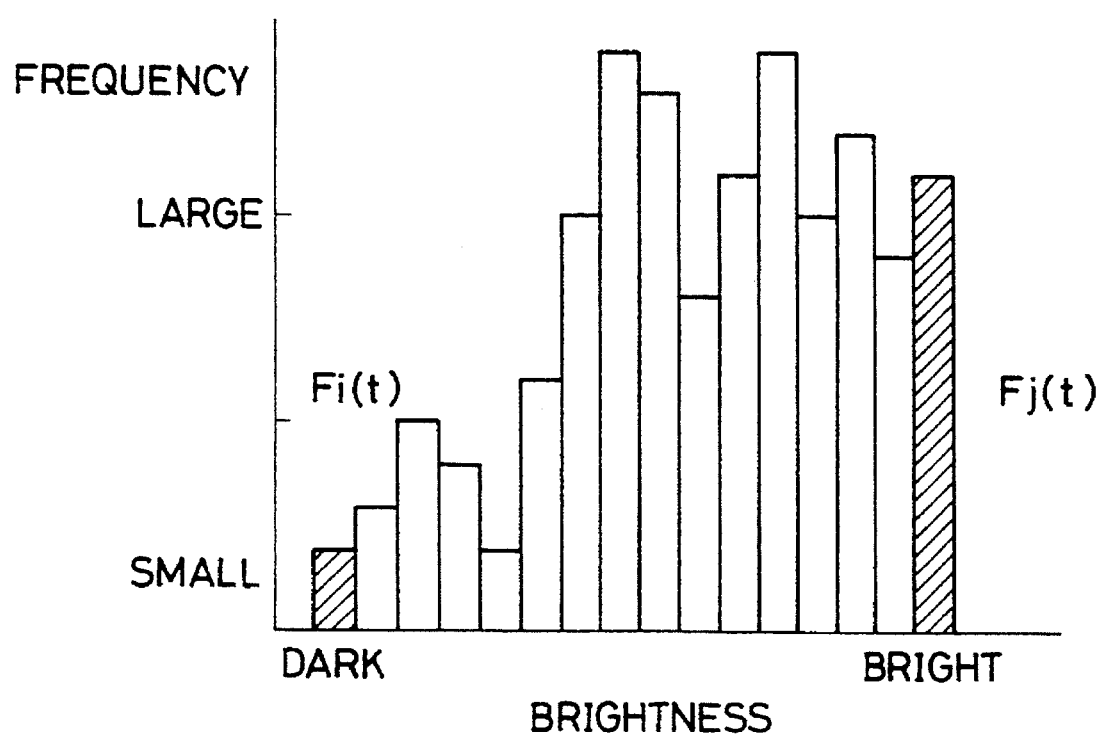
FIG. 24 is a schematic diagram showing a brightness histogram within a particular zone.
Figure 25:
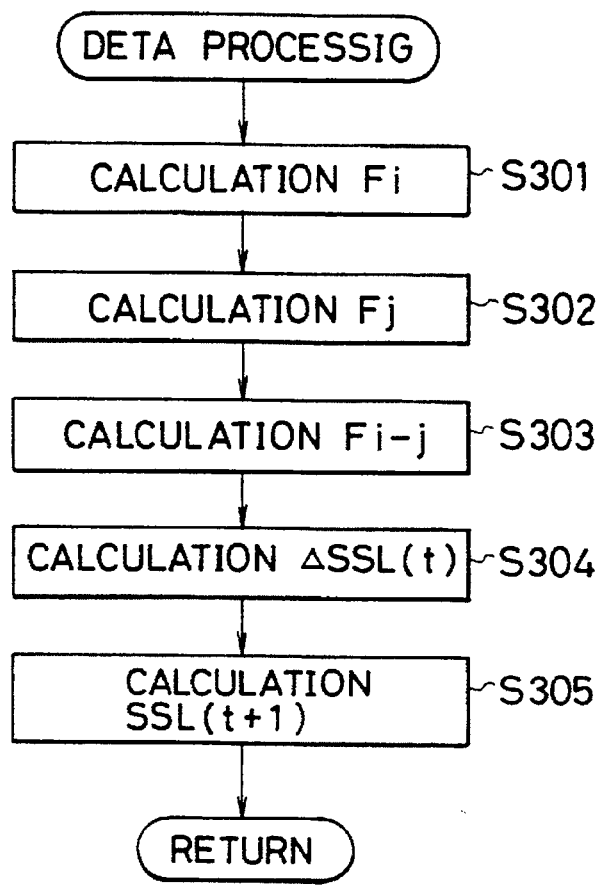
FIG. 25 is a flowchart showing the data processing based on the brightness histogram.
Figure 26:
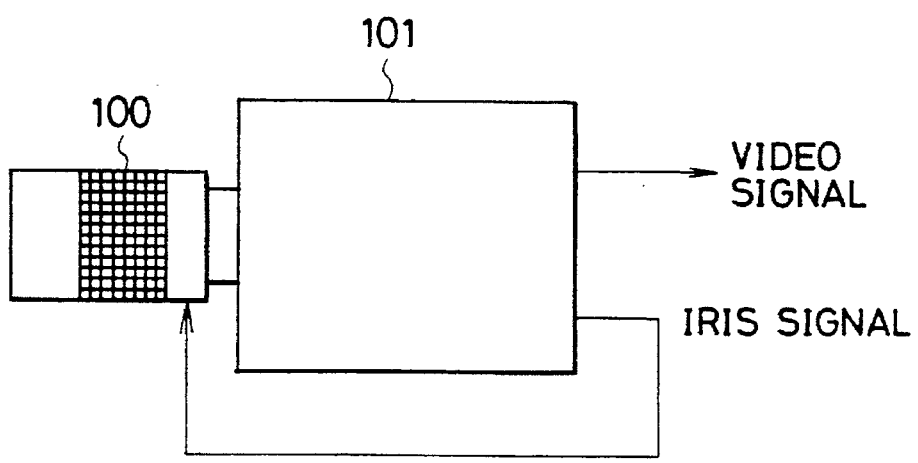
FIG. 26 shows a prior art system.

FIG. 24 and FIG. 25 are for the second embodiment according to the present invention. FIG. 24 is a schematic diagram showing a brightness histogram within a particular zone and FIG. 25 is a flowchart showing the data processing based on the brightness histogram.

This second embodiment according to the present invention provides another approach in processing the data at the step S103.

In the first embodiment according to the present invention, a proper shutter speed is determined based on averaged brightness of a plurality of the divided zones, however in this second embodiment according to the present invention, the proper shutter speed is determined based on the brightness data of a particular zone.

That is to say, in this case, the most important zone for recognizing a lane marker guiding his or her vehicle and an obstacle ahead of the vehicle is selected as a particular zone. With respect to the selected particular zone, it is judged whether or not the present shutter speed level is proper by producing a brightness histogram on this particular zone as illustrated in FIG. 24.

The data processing in this embodiment will be described in following paragraphs according to the flowchart in FIG. 25.

First, where the number of samplings is n, the brightness width for classifying the gradation data of each picture element is c, the time is t, and the shutter speed level is L, a brightness histogram as shown in FIG. 24 is produced by searching the particular zone. Next, the frequency $F_i(t)$ at the minimum brightness in this brightness histogram is calculated at S301 and the frequency $F_j(t)$ at the maximum brightness is calculated at S302. Further, the process proceeds to S303 where the difference of $F_i(t)$ and $F_j(t)$, namely, $F_i(t)-F_j(t)$ is calculated to investigate the brightness distribution of the particular zone and that difference is designated as an evaluation function $F_{i-j}(t)$ which indicates whether or not the present shutter speed is proper.

Further, at the next step S304, the shutter speed level control amount $\Delta SSL(t)$ is calculated from the evaluation function $F_{i-j}(t)$ obtained at S303. The shutter speed level control amount $\Delta SSL(t)$ is obtained as a ratio to the shutter speed level L according to the following equations which have been experimentally determined.

| | |
|---|---|
| $F_{i-j}(t) < -n/2$ | $\Delta SSL(t) = L/2$ |
| $-n/2 \leq F_{i-j}(t) < -n/4$ | $\Delta SSL(t) = L/4$ |
| $-n/4 \leq F_{i-j}(t) < -n/8$ | $\Delta SSL(t) = L/8$ |
| . | . |
| . | . |
| . | . |
| $n/8 \leq F_{i-j}(t) < n/4$ | $\Delta SSL(t) = -L/8$ |
| $n/4 \leq F_{i-j}(t) < n/2$ | $\Delta SSL(t) = -L/4$ |
| $n/2 \leq F_{i-j}(t)$ | $\Delta SSL(t) = -L/2$ |

Thus, when the shutter speed level control amount $\Delta SSL(t)$ is determined, the proper shutter speed $SSL(t+1)$ to be used for taking the next picture is obtained at S305 by the following formula:

$$SSL(t+1)=SSL(t)+\Delta SSL(t) \qquad (3)$$

where, $SSL(t+1)$ is a proper shutter speed for the next picture, and $SSL(t)$ is a shutter speed for the present picture.

In the above second embodiment, the brightness histogram is prepared to pick up therefrom the frequency $F_i(t)$ at the minimum brightness and the frequency $F_j(t)$ at the maximum brightness in the particular zone, however it is not necessary to prepare the brightness histogram for that purpose. For example, it is possible to produce the frequency $F_i(t)$ at the minimum brightness and the frequency $F_j(t)$ at the maximum brightness independently directly from the brightness data of the particular zone without using the brightness histogram. Furthermore, in the second embodiment, the frequency $F_i(t)$ and the frequency $F_j(t)$ are not necessarily to be a single value respectively and it is also possible to pick up a plurality of frequencies nearby the minimum brightness and the maximum brightness from the brightness histogram or produce these frequencies directly from the brightness data of the particular zone.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A shutter speed control method for controlling a shutter speed of a stereoscopical imaging apparatus which images an object from a plurality of different directions, the method comprising the steps of:

dividing the image of the object produced by the imaging apparatus into a plurality of zones;

averaging a brightness for each zone to produce an average brightness value for each zone;

for each zone, determining a zone correction level with respect to a present shutter speed of the imaging apparatus, based upon the average brightness value for the zone;

producing a shutter speed correction level based upon the determined zone correction levels; and correcting said present shutter speed of the imaging apparatus based on the shutter speed correction level, to thereby obtain a new shutter speed for the imaging apparatus.

2. A shutter speed control method according to claim 1, wherein the determined zone correction level for each zone is determined from a zone correction level map, the zone correction level map identifying a zone correction level for each of a predetermined number of combinations of a current shutter speed of the imaging apparatus and an average brightness value for the zone.

3. A shutter speed control method according to claim 1, wherein the shutter speed correction level is obtained by adding the determined zone correction levels.

4. A shutter speed control method for controlling a shutter speed of a stereoscopical imaging apparatus which images an object from a plurality of different directions, the method comprising the steps of:

designating at least one particular zone of the image of the object produced by the imaging apparatus;

calculating a frequency distribution of brightness levels in the particular zone;

producing a brightness histogram for the particular zone from the calculated frequency distribution of brightness levels;

calculating a correction level with respect to a present shutter speed of the imaging apparatus based upon the brightness histogram; and correcting the present shutter speed of the imaging apparatus based upon the correction level, to thereby produce a new shutter speed for the imaging apparatus.

5. A shutter speed control method according to claim 4, wherein the correction level is calculated based upon a difference ($F_{i\text{-}j}(t)$) between a frequency of a highest brightness level in the particular zone and a frequency of a lowest brightness level in the particular zone.

6. A shutter speed control method according to claim 5, wherein the correction level ($\Delta SSL(t)$) is calculated according to a set of rules including the following:

when $F_{i\text{-}j}(t) < -n/2$, then $\Delta SSL(t) = SSL(t)/2$;

when $-n/2 \leq F_{i\text{-}j}(t) < -n/4$, then $\Delta SSL(t) = SSL(t)/4$;

when $-n/4 \leq F_{i\text{-}j}(t) < -n/8$, then $\Delta SSL(t) = SSL(t)/8$;

when $n/8 \leq F_{i\text{-}j}(t) < n/4$, then $\Delta SSL(t) = -SSL(t)/8$;

when $n/4 \leq F_{i\text{-}j}(t) < n/2$, then $\Delta SSL(t) = -SSL(t)/4$; and when $n/2 \leq F_{i\text{-}j}(t)$, then $\Delta SSL(t) = -SSL(t)/2$;

where $SSL(t)$ is the current shutter speed for the imaging apparatus and n is the number of samples of brightness levels obtained from the image for the brightness histogram, and wherein the new shutter speed $SSL(t+1) = SSL(t) + \Delta SSL(t)$.

7. A shutter speed control system for controlling a shutter speed of a stereoscopical imaging apparatus which images an object from a plurality of different directions, the system comprising:

zone dividing means for dividing the image of the object produced by the imaging apparatus into a plurality of zones;

brightness averaging means for averaging a brightness of each zone and for producing an average brightness value for each zone; and correction level determining means for determining a zone correction level with respect to a present shutter speed of the imaging apparatus for each zone, in response to the average brightness value for the zone, and for producing a shutter speed correction level based upon the determined zone correction levels.

8. A shutter speed control system according to claim 7, further including memory means for storing at least one zone correction level map, each zone correction level map identifying a correction level for each of a predetermined number of combinations of a current shutter speed of the imaging apparatus and an average brightness value for the zone, whereby the correction level determining means determines each determined zone correction level from a zone correction level map stored in the memory means.

9. An imaging system according to claim 7, wherein the correction level determining means includes addition means for adding the determined zone correction levels to obtain the shutter speed correction level.

10. An imaging system comprising:

an imaging apparatus for imaging an object from a plurality of different directions; and a shutter speed control system as set forth in claim 7.

11. An imaging system according to claim 10, wherein the imaging apparatus is provided with two image cameras having solid state camera elements for imaging an object at a short distance.

12. An imaging system according to claim 10, wherein the imaging apparatus is provided with two image cameras having solid state camera elements for imaging an object at a long distance.

13. A shutter speed control system for controlling a shutter speed of a stereoscopical imaging apparatus which images an object from a plurality of different directions, the system comprising:

zone designating means for designating at least one particular zone of the image of the object produced by the imaging apparatus;

frequency distribution producing means for calculating a frequency distribution of brightness in the particular zone and for producing a brightness histogram for the particular zone from the calculated frequency distribution of brightness;

correction level calculating means for calculating a correction level with respect to a present shutter speed of the imaging apparatus in response to the brightness histogram; and shutter speed correcting means for correcting the present shutter speed of the imaging apparatus in response to the calculated correction level, to thereby produce a new shutter speed for the imaging apparatus.

14. The shutter speed control system according to claim 13, wherein the correction level calculating means calculates the correction level based upon a difference ($F_{i\text{-}j}(t)$) between a frequency of a highest brightness level in the particular zone and a frequency of a lowest brightness level in the particular zone.

15. The shutter speed control system according to claim 14, wherein the correction level calculating means calculates the correction level ($\Delta SSL(t)$) according to a set of rules including the following:

when $F_{i\text{-}j}(t) < -n/2$, then $\Delta SSL(t) = SSL(t)/2$;

when $-n/2 \leq F_{i\text{-}j}(t) < -n/4$, then $\Delta SSL(t) = SSL(t)/4$;

when $-n/4 \leq F_{i\text{-}j}(t) < -n/8$, then $\Delta SSL(t) = SSL(t)/8$;

when $n/8 \leq F_{i\text{-}j}(t) < n/4$, then $\Delta SSL(t) = -SSL(t)/8$;

when $n/4 \leq F_{i\text{-}j}(t) < n/2$, then $\Delta SSL(t) = -SSL(t)/4$; and when $n/2 \leq F_{i\text{-}j}(t)$, then $\Delta SSL(t) = -SSL(t)/2$;

where $SSL(t)$ is the current shutter speed for the imaging apparatus and n is the number of samples of brightness levels obtained from the image for the brightness histogram, and wherein the new shutter speed $SSL(t+1) = SSL(t) + \Delta SSL(t)$.

16. An imaging system comprising:

an imaging apparatus for imaging an object from a plurality of different directions; and a shutter speed control system as set forth in claim 13.

17. An imaging system according to claim 16, wherein the imaging apparatus is provided with two image cameras having solid state camera elements for imaging an object at a short distance.

18. An imaging system according to claim 16, wherein the imaging apparatus is provided with two image cameras having solid state camera elements for imaging an object at a long distance.

* * * * *